United States Patent
Kikuchi et al.

(10) Patent No.: US 11,080,310 B2
(45) Date of Patent: Aug. 3, 2021

(54) INFORMATION PROCESSING DEVICE, SYSTEM, INFORMATION PROCESSING METHOD, AND PROGRAM

(71) Applicant: SONY CORPORATION, Tokyo (JP)

(72) Inventors: Megumi Kikuchi, Tokyo (JP); Toshihiko Kawai, Kanagawa (JP); Atsushi Kuribayashi, Kanagawa (JP); Akira Tange, Tokyo (JP); Shigefumi Tamura, Tokyo (JP)

(73) Assignee: SONY CORPORATION, Tokyo (JP)

( * ) Notice: Subject to any disclaimer, the term of this patent is extended or adjusted under 35 U.S.C. 154(b) by 217 days.

(21) Appl. No.: 16/033,559

(22) Filed: Jul. 12, 2018

(65) Prior Publication Data
US 2018/0322145 A1    Nov. 8, 2018

Related U.S. Application Data

(63) Continuation of application No. 14/428,069, filed as application No. PCT/JP2013/074152 on Sep. 6, 2013, now Pat. No. 10,037,342.

(30) Foreign Application Priority Data

Nov. 22, 2012  (JP) .................................. 2012-256132

(51) Int. Cl.
*G06F 17/00*    (2019.01)
*G06F 16/29*    (2019.01)
(Continued)

(52) U.S. Cl.
CPC .............. *G06F 16/29* (2019.01); *A63F 13/35* (2014.09); *A63F 13/50* (2014.09); *A63F 13/58* (2014.09);
(Continued)

(58) Field of Classification Search
CPC .... G06F 16/29; G06F 16/24578; A63F 13/12; A63F 13/50; A63F 13/65; A63F 13/35;
(Continued)

(56) References Cited

U.S. PATENT DOCUMENTS

2003/0235341 A1    12/2003  Gokturk
2007/0050715 A1    3/2007   Behar
(Continued)

FOREIGN PATENT DOCUMENTS

JP    2002-190034    7/2002
JP    2003-242095    8/2003
(Continued)

OTHER PUBLICATIONS

Decision to Refuse dated Jul. 10, 2019 in European Application No. 13856838.1.
(Continued)

*Primary Examiner* — Syed H Hasan
(74) *Attorney, Agent, or Firm* — Xsensus LLP

(57) ABSTRACT

There is provided an information processing device including an action history acquiring unit configured to acquire action history information on a user, the action history information being accumulated in a predetermined time frame, an attribute score calculating unit configured to calculate an attribute score of the user for one or more attributes in an attribute group, the attribute score being based on the action history information, and an object generating unit configured to generate an object on the basis of the attribute score, the object representing the user.

21 Claims, 25 Drawing Sheets

(51) Int. Cl.
G06F 16/2457 (2019.01)
A63F 13/65 (2014.01)
A63F 13/35 (2014.01)
A63F 13/58 (2014.01)
A63F 13/61 (2014.01)
A63F 13/50 (2014.01)

(52) U.S. Cl.
CPC .............. *A63F 13/61* (2014.09); *A63F 13/65* (2014.09); *G06F 16/24578* (2019.01); *A63F 2300/556* (2013.01); *A63F 2300/5553* (2013.01); *A63F 2300/61* (2013.01)

(58) Field of Classification Search
CPC .............. A63F 13/58; A63F 2300/5553; A63F 2300/556; A63F 2300/61; A63F 13/61
See application file for complete search history.

(56) References Cited

U.S. PATENT DOCUMENTS

| | | | | |
|---|---|---|---|---|
| 2008/0039124 | A1* | 2/2008 | Linder | H04M 1/72552 455/466 |
| 2009/0070197 | A1* | 3/2009 | Ermolli | G06Q 10/00 705/7.29 |
| 2009/0193343 | A1* | 7/2009 | Jones | A63F 13/12 715/753 |
| 2009/0264172 | A1 | 10/2009 | Morimura et al. | |
| 2009/0300513 | A1 | 12/2009 | Nims et al. | |
| 2010/0007763 | A1 | 1/2010 | Yokohata | |
| 2010/0017237 | A1* | 1/2010 | Dalesandro | G06F 3/04855 705/5 |
| 2010/0146433 | A1 | 6/2010 | Murata et al. | |
| 2010/0229106 | A1 | 9/2010 | Lee | |
| 2011/0052081 | A1 | 3/2011 | Onoe | |
| 2011/0093820 | A1* | 4/2011 | Zhang | A63F 13/06 715/863 |
| 2012/0033032 | A1* | 2/2012 | Kankainen | H04N 5/272 348/36 |
| 2012/0271883 | A1* | 10/2012 | Montoya | H04W 4/21 709/204 |
| 2012/0326873 | A1* | 12/2012 | Utter, II | A61B 5/0022 340/573.1 |
| 2013/0073388 | A1* | 3/2013 | Heath | G06Q 30/02 705/14.53 |
| 2013/0305168 | A1 | 11/2013 | Murata et al. | |
| 2014/0223327 | A1* | 8/2014 | Mantripragada | G09F 27/00 715/744 |

FOREIGN PATENT DOCUMENTS

| | | |
|---|---|---|
| JP | 2004-5422 | 1/2004 |
| JP | 2004-274550 | 9/2004 |
| JP | 2005-354391 | 12/2005 |
| JP | 2005-354392 | 12/2005 |
| JP | 2010-134802 | 6/2010 |
| JP | 2011-525648 | 9/2011 |
| WO | WO 2009/149076 A1 | 12/2009 |

OTHER PUBLICATIONS

ArcGIS 9.3 Webhelp Topic "Selecting features interactively" http://webhelp.esri.com/arcgisdesktop/9.3/print.cfm?TopicName=Selecting features interactively, (published April, Apr. 24, 2009).
International Search Report dated Oct. 15, 2013 in PCT/JP2013/074152.
Extended European Search Report dated Jun. 15, 2016 in Patent Application No. 13856838.1.
Combined Chinese Office Action and Search Report dated Dec. 13, 2016 in Chinese Patent Application No. 201380054406.1 (with English language translation).
Office Action dated Dec. 6, 2016 in Japanese Patent Application No. 2014-548484.

\* cited by examiner

FIG.4
| | SEX | OCCUPATION | WORKPLACE | HOME | SITTING | WALKING | RUNNING | EATING | SHOPPING | | |
|---|---|---|---|---|---|---|---|---|---|---|---|
| | | | | | | | | | DEPARTMENT STORE | SUPERMARKET | BOOKSTORE |
| USER A | MALE | OFFICE WORKER | 60 | 30 | 50 | 5 | 1 | 9 | 1 | 0 | 1 |
| USER B | MALE | OFFICE WORKER | 60 | 30 | 30 | 20 | 5 | 5 | 0 | 0 | 5 |
| USER C | FEMALE | OFFICE WORKER | 55 | 25 | 40 | 25 | 5 | 9 | 5 | 4 | 1 |
| USER D | FEMALE | OFFICE WORKER | 55 | 35 | 40 | 10 | 5 | 5 | 1 | 4 | 1 |
| USER E | FEMALE | HOUSEWIFE | 40 | 80 | 30 | 10 | 5 | 7 | 15 | 4 | 1 |
| USER F | FEMALE | HOUSEWIFE | 40 | 80 | 30 | 10 | 1 | 7 | 2 | 15 | 3 |
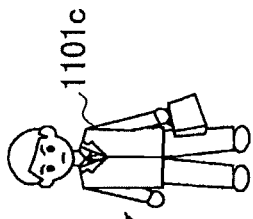
1101c
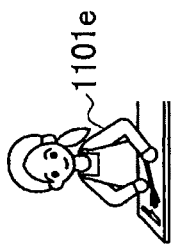
1101d
1101e

FIG.5

|  | SEX | OCCUPATION | WORKPLACE | HOME | SITTING | WALKING | RUNNING | EATING | SHOPPING | | BOOKSTORE |
|---|---|---|---|---|---|---|---|---|---|---|---|
|  |  |  |  |  |  |  |  |  | DEPARTMENT STORE | SUPERMARKET |  |
| USER A | MALE | OFFICE WORKER | 60 | 30 | 50 | 5 | 1 | 9 | 1 | 0 | 1 |
| USER B | MALE | OFFICE WORKER | 60 | 30 | 30 | 20 | 5 | 5 | 0 | 0 | 5 |
| USER C | FEMALE | OFFICE WORKER | 55 | 25 | 40 | 25 | 5 | 9 | 5 | 4 | 1 |
| USER D | FEMALE | OFFICE WORKER | 55 | 35 | 40 | 10 | 5 | 5 | 1 | 4 | 1 |
| USER E | FEMALE | HOUSEWIFE | 40 | 80 | 30 | 10 | 5 | 7 | 15 | 4 | 1 |
| USER F | FEMALE | HOUSEWIFE | 40 | 80 | 30 | 10 | 1 | 7 | 2 | 15 | 3 |

| ATTRIBUTE SCORE | 50~90 | 60~69 | 90~99 | 100 |
|---|---|---|---|---|
| WORK | WEAR NECKTIE | WEAR SUIT | SWEAT | HALO SHINES |
| SHOPPING | ONE SHOPPING BAG | TWO SHOPPING BAGS | DEPARTMENT STORE IN BACKGROUND | ATTENDANT |
| TRAIN TRAVEL | TRAIN SCHEDULE | CAMERA | RUCKSACK | WAIST POUCH |

FIG.15

|  | OBJECT TYPE | PRESENT POSITION | E-mail |
|---|---|---|---|
| USER A | BUSINESSPERSON | LONGITUDE A: LATITUDE A | AAA@yyy.zzz |
| USER B | GORGEOUS | LONGITUDE B: LATITUDE B | BBB@yyy.zzz |
| USER C | SPORTSPERSON | LONGITUDE C: LATITUDE C | CCC@yyy.zzz |
| USER D | BUSINESSPERSON | LONGITUDE D: LATITUDE D | DDD@yyy.zzz |

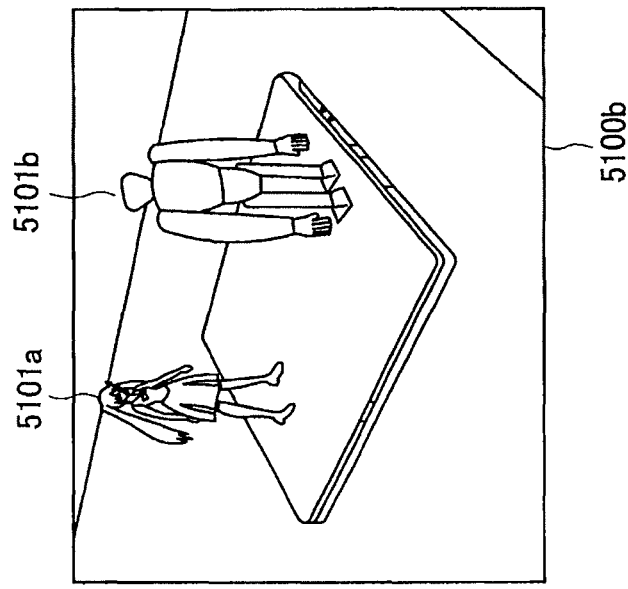
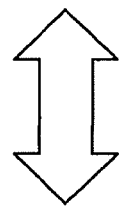
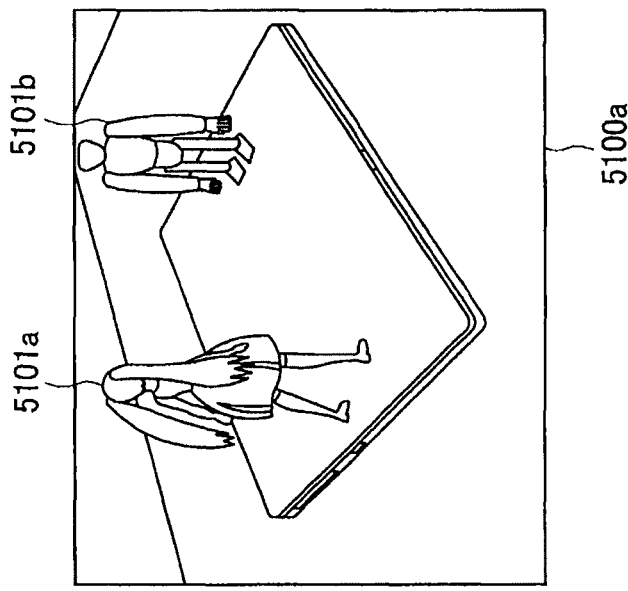
FIG.23

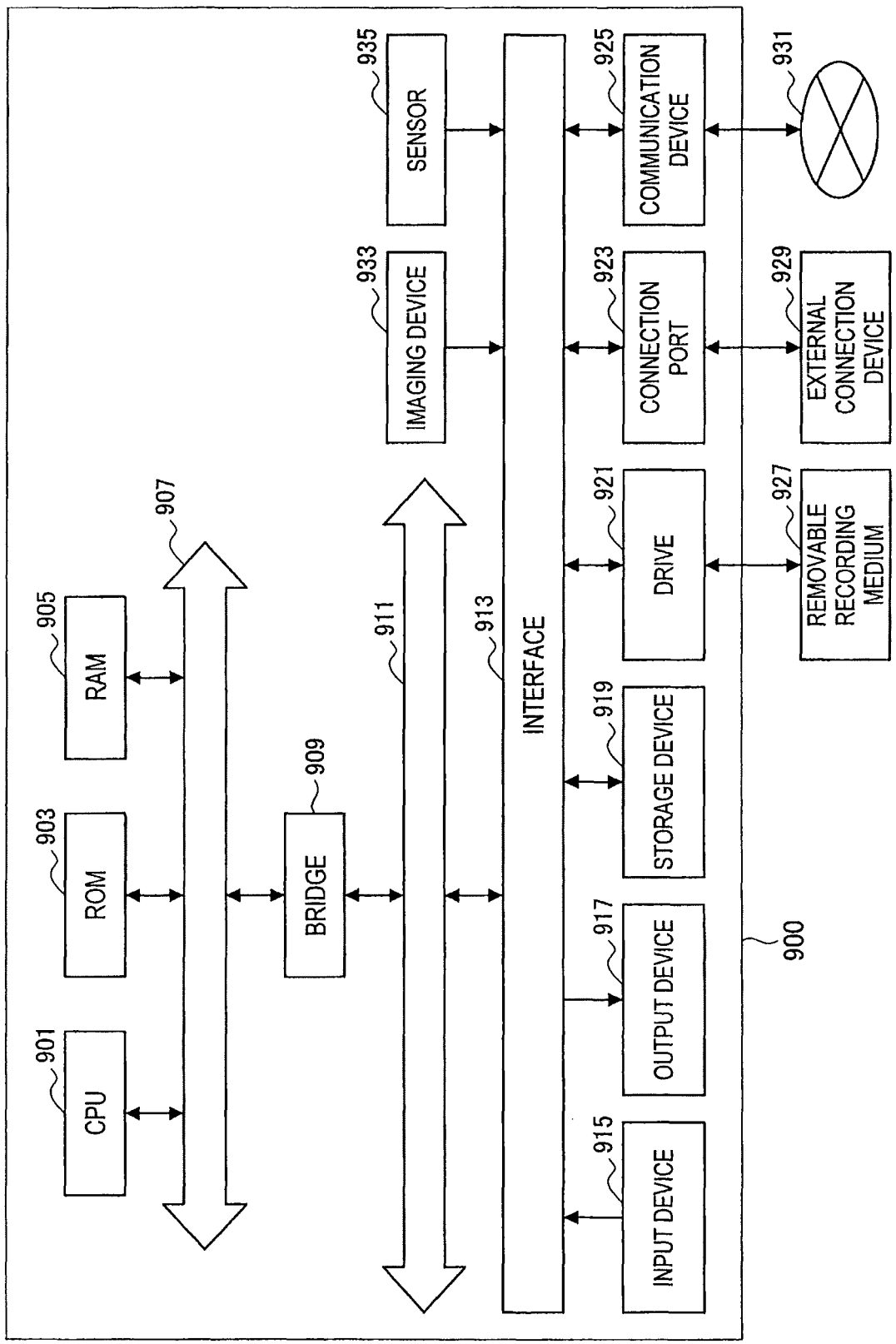

INFORMATION PROCESSING DEVICE, SYSTEM, INFORMATION PROCESSING METHOD, AND PROGRAM

CROSS-REFERENCE TO RELATED APPLICATIONS

This document is a continuation application of and is based upon and claims the benefit of priority under 35 U.S.C. § 120 from U.S. Ser. No. 14/428,069, filed Mar. 13, 2015, herein incorporated by reference, which is a National Stage Application of International Application No. PCT/JP2013/074152, filed Sep. 6, 2013. The present document also incorporates by reference the entire contents of Japanese priority document, 2012-256132 filed in Japan on Nov. 22, 2012.

TECHNICAL FIELD

The present disclosure relates an information processing device, a system, an information processing method, and a program.

BACKGROUND ART

For example, when users have conversations with each other in virtual space such as online games and community sites, avatars representing users are frequently displayed along with text showing their comments. Avatars provide, for example, visual images to the presence of users in virtual space to approximate the presence of the users in the virtual space to the presence in real space, thereby smoothing communication of the users in the virtual space with each other.

A technique has also been devised for associating an actual state of a user with such avatar display. For example, Patent Literature 1 describes a technique of changing a facial expression and movement of an avatar in a manner that an emotion corresponding to a change in biological information on a user and a facial expression of a user is expressed. In addition, Patent Literature 2 describes a technique of expressing intimacy of each user with another user and an activity state of another user in terms of the display position of an object representing each user.

CITATION LIST

Patent Literature

Patent Literature 1: JP 2002-190034A
Patent Literature 2: JP 2010-134802A

SUMMARY OF INVENTION

Technical Problem

However, these techniques certainly change facial expressions and movement of avatars in accordance with the states of users, but avatars as such are freely set by users. Consequently, an avatar may be considerably different from the actual personality of a user in some situations. For example, when a middle-aged male user sets a girl as his avatar, the state of the user can be certainly expressed from a change in the facial expression, but the avatar as such is still different from the actual personality of the user.

Communication in virtual space allows users to be free from the users themselves in the actual world in some scenes. However, widespread use of social networking services (SNSs) or social media have frequently linked the presence in virtual space with the presence in the actual world in recent years. More natural and smooth communication can be expected in such a case, if avatars represent the actual personalities of users.

Accordingly, the present disclosure provides a novel and improved information processing device, system, information processing method, and program that allow an object reflecting the personality of a user to represent the user.

Solution to Problem

According to the present disclosure, there is provided a server including an action history acquiring unit configured to acquire action history information on a user, the action history information being accumulated in a predetermined time frame, an attribute score calculating unit configured to calculate an attribute score of the user for one or more attributes in an attribute group, the attribute score being based on the action history information, and an object generating unit configured to generate an object on the basis of the attribute score, the object representing the user.

In addition, according to the present disclosure, there is provided a client including a sensing unit configured to sense an action of a user, a communication unit configured to transmit a result of the sensing to a server, and to receive information on an object from the server, the object being generated on the basis of an attribute score calculated for one or more attributes in an attribute group on the basis of action history information on the user accumulated in a predetermined time frame and representing the user, the action history information being generated on the basis of information including the result of the sensing, and a display control unit configured to cause a display unit to display the object.

In addition, according to the present disclosure, there is provided a system including a client, and a server. The client includes a sensing unit configured to sense an action of a user, a communication unit configured to transmit a result of the sensing to the server, and to receive information on an object from the server, the object representing the user, and a display control unit configured to cause a display unit to display the object. The server includes an action history acquiring unit configured to acquire action history information on the user, the action history information being accumulated in a predetermined time frame and being generated on the basis of information including the result of the sensing, an attribute score calculating unit configured to calculate an attribute score of the user for one or more attributes in an attribute group, the attribute score being based on the action history information, and an object generating unit configured to generate the object on the basis of the attribute score.

In addition, according to the present disclosure, there is provided an information processing method including acquiring action history information on a user, the action history information being accumulated in a predetermined time frame, calculating an attribute score of the user for one or more attributes in an attribute group, the attribute score being based on the action history information, and generating an object on the basis of the attribute score, the object representing the user.

In addition, according to the present disclosure, there is provided a program for causing a computer to execute a function of acquiring action history information on a user, the action history information being accumulated in a predetermined time frame, a function of calculating an attribute score of the user for one or more attributes in an attribute group, the attribute score being based on the action history information, and a function of generating an object on the basis of the attribute score, the object representing the user.

It can be said that a life of a user in a predetermined time frame is reflected on action history information on the user accumulated in the time frame. Calculating an attribute score for one or more attributes in an attribute group from the action history information offers an indicator that indicates the personality of the user. If an object is generated on the basis of the indicator or the attribute score, the personality of the user is reflected on the generated object.

Advantageous Effects of Invention

According to the present disclosure as described above, it is possible for an object that reflects the personality of a user to represent the user.

BRIEF DESCRIPTION OF DRAWINGS

FIG. 4 is a diagram illustrating an example of data used in the first embodiment of the present disclosure.

FIG. 5 is a diagram illustrating a first example in which an object generating condition is set in the first embodiment of the present disclosure.

FIG. 9 is a diagram illustrating an example of setting an object step by step in the first embodiment of the present disclosure.

FIG. 15 is a diagram illustrating an example of data used in the third embodiment of the present disclosure.

FIG. 23 is a diagram illustrating a second display example in the fourth embodiment of the present disclosure.

FIG. 25 is a block diagram for describing a hardware configuration of an information processing device.

DESCRIPTION OF EMBODIMENTS

Hereinafter, preferred embodiments of the present disclosure will be described in detail with reference to the appended drawings. Note that, in the present description and the drawings, elements that have substantially the same function and structure are denoted with the same reference signs, and repeated explanation is omitted.

Figure 1:
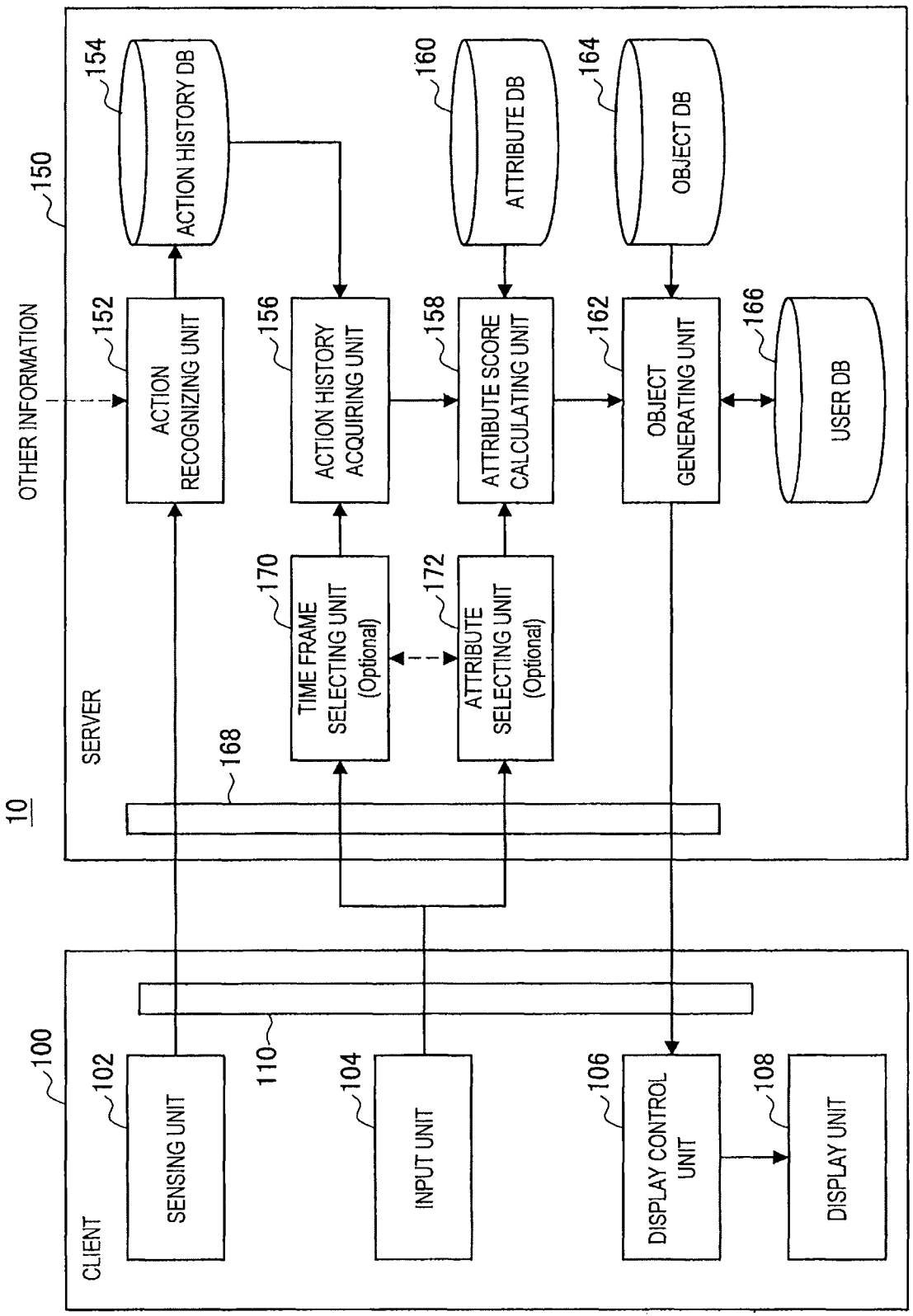
FIG. 1 is a block diagram illustrating a schematic functional configuration of a system according to a first embodiment of the present disclosure

The description will be now made in the following order.
1. First Embodiment
  1-1. Functional Configuration
  1-2. Example of Process
  1-3. Example of Data
  1-4. Example of Object Generating Condition
  1-5. Example of Setting Object Step by Step
  1-6. Modified Examples for Functional Configuration
2. Second Embodiment
3. Third Embodiment
  3-1. Functional Configuration
  3-2. Example of Process
  3-3. Display Example
  3-4. Modified Example
4. Fourth Embodiment
5. Hardware Configuration
6. Supplement 1. First Embodiment First of all, a first embodiment of the present disclosure will be described with reference to FIGS. 1 to 11.
(1-1. Functional Configuration)
FIG. 1 is a block diagram illustrating a schematic functional configuration of a system according to a first embodiment of the present disclosure. FIG. 1 illustrates that a system 10 includes a client 100 and a server 150. The client 100 and the server 150 are connected to each other via various wired or wireless networks, and communicate with each other as needed. The configuration of each of the client 100 and the server 150 will be further described below.
(Client)
The client 100 includes a sensing unit 102, an input unit 104, a display control unit 106, a display unit 108, and a communication unit 110. The client 100 is implemented as a variety of information processing devices used by a user such as mobile phones (smartphones), various personal computers (PCs), media players, and game consoles. The information processing devices are implemented, for example, as a hardware configuration as discussed below.

Here, the client 100 may be implemented as a single device or a plurality of devices. For example, the sensing unit 102 is desired to be implemented as a device such as a mobile phone (smartphone) carried by a use for sensing an action of the user. Meanwhile, the input unit 104, the display control unit 106, and the display unit 108 do not necessarily have to be carried by a user, so that the input unit 104, the display control unit 106, and the display unit 108 may be implemented as the same device as the sensing unit 102, or a device different from the sensing unit 102 including a stationary device such as a desktop PC. Each functional configuration of the client 100 will be described below.

The sensing unit 102 senses an action of a user who uses the client 100. The sensing unit 102 is implemented as a variety of sensor such as acceleration sensors, gyro sensors, geomagnetic sensors, optical sensors and audio sensors, and/or global positioning system (GPS) receivers, and senses the position, activity state or the like of a user. The sensing unit 102 transmits a result of the sensing to the server 150 via the communication unit 110.

The input unit 104 receives an input of a user regarding a filtering condition for generating an object in the server 150. As discussed below, the server 150 has a function of selecting a range of action histories to be acquired, or an attribute score to be emphasized for generating an object that represents a user in some cases. In this case, a user can make his or her desire reflected on the generation of an object to some extent by inputting information on the selection, for example, via the input unit 104. The input unit 104 is implemented as an input device such as a touch panel, a keyboard and a mouse, and transmits the received input to the sever 150 via the communication unit 110.

The display control unit 106 receives information on the object generated in the server 150 via the communication unit 110, and causes the display unit 108 to display the object. The object is an object such as an avatar that represents a user. An object displayed here using the received information may include an object generated for a user whose action is sensed by the sensing unit 102, an object generated for another user, or both of the objects. The display control unit 106 may display an object alone, or may display an object in a screen for another application or the like. In addition, the display control unit 106 superimposes an object on an image of the corresponding user (such as a captured image provided from an augmented reality (AR) application or an image of the real space seen through a see-through display unit 108). The display control unit 106 is implemented, for example, by a central processing unit (CPU) operating in accordance with a program stored in a memory.

The display unit 108 displays a variety of information for a user in accordance with control exerted by the display control unit 106. As described for the display control unit 106, information displayed on the display unit 108 includes an object that represents a user. The display unit 108 is implemented, for example, as a variety of displays. The display may be, for example, a flat display or a head mounted display. In addition, the display may be, for example, a non-transmissive display or a transmissive display.

The communication unit 110 transmits and receives a variety of information exchanged between the client 100 and the server 150. The communication unit 110 is implemented, for example, as a variety of communication interfaces that are connected to a network.
(Server)

The server 150 includes an action recognizing unit 152, an action history DB 154, an action history acquiring unit 156, an attribute score calculating unit 158, an attribute DB 160, an object generating unit 162, an object DB 164, a user DB 166, and a communication unit 168. The server 150 may further include one or both of a time frame selecting unit 170 and an attribute selecting unit 172. The server 150 may be implemented as a single information processing device or a plurality of information processing devices that are connected to each other via various wired or wireless networks and operate in cooperation with each other. The information processing devices are implemented, for example, as a hardware configuration as discussed below. Each functional configuration will be described below. Additionally, each unit other than the DBs and the communication unit is implemented, for example, by a CPU operating in accordance with a program stored in a memory. The DBs are implemented, for example, as storage devices.

The action recognizing unit 152 recognizes an action of a user of the client 100 on the basis of a result of sensing received from the sensing unit 102 of the client 100 via the communication unit 168, and stores a result of the recognition in the action history DB 154. The action recognizing unit 152 may further acquire other information from another server and the like, and recognize an action of the user further on the basis of the information. The other information may be, for example, a purchase log in a store, a history indicating a terminal installed at a certain place is operated, or the like. The action recognizing unit 152 may further use registered information including the address and workplace of a user for recognizing an action. Additionally, techniques of recognizing actions are introduced in a large number of documents such as JP 2012-8771A in detail, and the action recognizing unit 152 uses these techniques as required to recognize an action of a user.

Results of recognition by the action recognizing unit 152 are accumulated in the action history DB 154 as an action history of a user. Information accumulated in the action history DB 154 may be, for example, a position history, purchase history, operation history, and the like of a user, or an action pattern history, action type history, and the like that reflect a result of recognition by the action recognizing unit 152. For example, the following may be accumulated as an example of such unlimited information. Whether a terminal device is being charged or operated. Whether a user is resting, sitting, walking, running, or jumping. Whether a user is moving, and the position. Whether a user is in a train, in a car, or on an elevator. Whether a user is working or shopping. An action of a user estimated from a tone in a text log input by the user. It is possible to identify how a user acted at certain time in the past, if that information accumulated in the action history DB 154 is referenced.

The action history acquiring unit 156 acquires action history information on a user accumulated in a predetermined time frame from the action history DB 154. The action history acquiring unit 156 may specify the last certain time frame (e.g. one year in the past) or all the time frames in which action history information exists (i.e. from time when a user began to use a service for acquiring action histories to the present time) as the predetermined time frame. When the time frame selecting unit 170 is additionally installed and the time frame selecting unit 170 has selected a time frame, the action history acquiring unit 156 acquires action history information for the selected time frame. When no time frame has been selected, the action history acquiring unit 156 acquires action history information in the same way as the action history acquiring unit 156 does when the time frame selecting unit 170 is not installed.

The attribute score calculating unit 158 calculates an attribute score for one or more attributes in an attribute group on the basis of the action history information on a user acquired by the action history acquiring unit 156. The attributes may indicate the personality of a user, and relate to, for example, work, shopping, eating or the like. The attributes are registered in the attribute DB 160 in advance as an attribute group. The attribute score calculating unit 158 may calculate attribute scores for all or a part of the attributes in the attribute group. When attribute scores are calculated for a plurality of attributes, the attribute score calculating unit 158 may normalize the respective scores to allow the magnitudes of the scores to be compared between the different attributes. In addition, the attribute score calculating unit 158 may temporarily store the calculated attribute scores in the attribute DB 160 in association with a user, and regularly update the attribute scores.

When the attribute selecting unit 172 is additionally installed, selection by the attribute selecting unit 172 decides an attribute score to be emphasized for the object generating unit 162 discussed below to generate an object. In this case, the attribute score calculating unit 158 may calculate, for example, an attribute score for only the attribute selected by the attribute selecting unit 172, or may weight the selected attribute to calculate an attribute score. Alternatively, the attribute score calculating unit 158 calculates attribute scores for one or more attributes in an attribute group irrespective of selection by the attribute selecting unit 172 and stores the calculated attribute scores in the attribute DB 160, and then the attribute score calculating unit 158 may perform re-computation such as weighting in reading out the attribute scores stored in accordance with the selection by the attribute selecting unit 172. Additionally, an attribute and an attribute score are related to the generation of an object discussed below, so that those specific examples will be described along with an example of an object.

The attribute DB 160 stores information on an attribute score calculated by the attribute score calculating unit 158. For example, the attribute DB 160 stores information for defining an attribute group for which an attribute score is calculated. In addition, an attribute score calculated by the attribute score calculating unit 158 may be stored in the attribute DB 160 in association with a user, and may be regularly updated by the attribute score calculating unit 158. Definition information on each attribute included in an attribute group includes, for example, information for defining a relationship between an action history and an attribute score. For example, for an attribute "work," a rule that "an attribute score is added in accordance with a time for which a user has been at a workplace" may be defined.

Additionally, as discussed below, when an object is generated on the basis of an attribute score, information in the object DB 164 is referenced. Definition information on an attribute stored in the attribute DB 160 thus corresponds to information on an object stored in the object DB 164. For example, when an attribute "work" is defined in the attribute DB 160, an object to be selected in accordance with an attribute score for "work" is defined in the object DB 164.

The object generating unit 162 generates an object that represents a user, on the basis of an attribute score provided from the attribute score calculating unit 158. The object is, for example, an image that represents a user whose action history information is provided and is displayed for the user and/or another user. For example, when an object is an image of a specific object (such as a human, an animal, and a robot), the object can also be regarded as an avatar (incarnation) of a user. An object may also be an abstract image such as a figure. Even in this case, the object represents a user with its shape, size, color, and the like.

Additionally, specific examples of objects will be discussed below. The object generating unit 162 transmits the generated object to the client 100 via the communication unit, and the transmitted object is used for the display control unit 106 to cause the display unit 108 to perform display. Furthermore, the object generating unit 162 may store the generated object in the user DB 166 in association with a user, and then read out the object when the object is requested to be provided again.

Here, the object generating unit 162 references information registered in the object DB 164 in advance, and generates an object on the basis of an attribute score. More specifically, the object generating unit 162 uses an attribute score to search for information registered in the object DB 164, and extracts information on an object that is appropriate for representing a user. For example, when the attribute score calculating unit 158 calculates attribute scores for a plurality of attributes, the object generating unit 162 may extract information on an object set for an attribute having the highest attribute score. Alternatively, the object generating unit 162 may extract information on an object set for each of attributes, and combine them in accordance with the respective attribute scores to generate an object.

Furthermore, the object generating unit 162 may reference registered information on a user stored in the user DB 166 to generate an object. In this case, the object generating unit 162 may select an appropriate object from a plurality of objects prepared for the same attribute scores, in accordance with the sex, age, occupation, and the like of a user. For example, generated objects having even the same attribute "work" may be different in accordance with whether users are male or female, whether user are young or old, whether users are office workers or factory workers, or the like. Referencing information on a user to generate an object in this way allows the object to more appropriately represent the personality of the user. Additionally, when an object is an abstract image or an image of a specific object unrelated to an attribute such as sex and age, the object generating unit 162 does not necessarily have to reference the user DB 166. It may be possible to allow a user to freely set, for example, the sex and age represented by an object.

The object DB 164 stores information on an object, the information being used for the object generating unit 162 to generate an object. An object is set, for example, in accordance with an attribute defined in the attribute DB 160. For example, when an attribute "work" is defined in the attribute DB 160, the object DB 164 stores information on at least one object corresponding to the attribute "work." Furthermore, a plurality of objects may be set in accordance with attribute scores. For example, objects may be set at a plurality of steps in accordance with a low attribute score, a middle attribute score, a high attribute score, or the like for an attribute "work," which can indicate how hard the user works. The object DB 164 may store data for each object, the data allowing an object to be displayed at a variety of postures and in a variety of sizes. In this case, the object generating unit 162, or the display control unit 106 of the client 100 decides the posture and size of an object to be displayed.

The user DB 166 stores information on a user. Examples of information on a user may include registered information such as a user ID, sex, age, an address, an occupation, and a workplace. As described above, registered information on a user stored in the user DB 166 may also be used for the object generating unit 162 to generate an object. Registered information may be referenced by a variety of units of the server 150 such as the action recognizing unit 152 in addition to the object generating unit 162. In addition, the user DB 166 may store information on an object generated by the object generating unit 162 in association with a user, and the stored information may be read out when the object is requested to be displayed.

The communication unit 168 transmits and receives a variety of information exchanged between the server 150 and the client 100. The communication unit 168 is implemented, for example, as a variety of communication interfaces that are connected to a network.

The time frame selecting unit 170 is additionally installed. The time frame selecting unit 170 selects a time frame to be emphasized for the object selecting unit 162 to generate an object, on the basis of the information received, via the communication unit 168, from the input unit 104, which has acquired an operation of a user in the client 100. A time frame may be selected, for example, on the basis of a cyclic time frame such as "summer," "weekday," "weekend," "daytime," "free time," and "time at home," or a non-cyclic time frame such as "until 10 years ago," "for a recent year," and "ten years later." When the time frame selecting unit 170 selects a time frame, the action history acquiring unit 156 may, for example, acquire action history information only in the selected time frame. Alternatively, the attribute score calculating unit 158 may weight the action history information in the selected time frame more than action history information in the other time frames, and calculate an attribute score.

Additionally, when a future time frame is selected, the action history acquiring unit 156, for example, acquires relatively near-past action history information on a user and the attribute score calculating unit 158 calculates an estimated value of an attribute score in the selected future time frame for the user, who continues the same action as the action in the action history. In this case, for example, an object generated through the selection of a future time frame for a user who has not recently exercised very much may be an object of an overweight person. The time frame selecting unit 170 can be one of the condition setting units which set a generating condition of an object in that the time frame selecting unit 170 sets a condition for a time frame in which action history information or a source of an attribute score is acquired.

The attribute selecting unit 172 is also additionally installed. The attribute selecting unit 172 selects an attribute to be emphasized for the object generating unit 162 to generate an object, on the basis of the information received, via the communication unit 168, from the input unit 104, which has acquired an operation of a user in the client 100. For example, when the attribute selecting unit 172 selects one or more attributes from an attribute group defined in the attribute DB 160, the attribute score calculating unit 158 may calculate attribute scores only for the selected attributes (the other attribute scores are 0), or may weight attribute scores for the selected attributes more than the other attribute scores. Alternatively, when the attribute score calculating unit 158 has already calculated and stored attribute scores in the attribute DB 160, weights for the attribute scores for the selected attributes among the attribute scores read out for generating an object may be re-computed.

Here, the number of selectable attribute scores may be set in advance. Alternatively, attributes may be selected in accordance with a pattern set in advance. For example, when attributes are selected in accordance with a pattern "daily action," one or more attributes relating to "work," "way to spend time at home," "way to move," and the like are selected. In addition, the selection of an attribute by the attribute selecting unit 172 and the selection of a time frame by the time frame selecting unit 170 may influence each other. For example, when the time frame selecting unit 170 selects a time frame "weekend," the attribute selecting unit 172 may select an attribute relating to an action on weekends such as "place for shopping," and "way to spend a leisure time." In addition, for example, when the attribute selecting unit 172 selects an attribute "work," the time frame selecting unit 170 may select a time frame "weekday," in which the "work" is probably carried out. The attribute selecting unit 172 can also be one of the condition setting units which set a generating condition of an object in that the attribute selecting unit 172 selects an attribute score used for generating an object.

The time frame selecting unit 170 and the attribute selecting unit 172, which are condition setting units, set a generating condition of an object in accordance with an operation of a user in the present embodiment. This allows a user to select which attribute in which time frame is reflected by an object representing the user himself or herself. In this way, a user can play the user himself or herself to some extent "in a way he or she would like to show." For example, even a user who is busy in work on weekdays can select a time frame "weekend" via the time frame selecting unit 170 to generate an object that represents "the sporting user," as long as the user enjoys sports on weekends. However, a user is not able to create the user himself or herself "in a way he or she would like to show" beyond the range indicated by an action history. For example, unless a user plays any sports on weekdays or weekends, the user is unable to generate an object that represents "the sporting user" in any way. In this way, even if a user is allowed to set a generating condition of an object, an object generated by the object generating unit 162 reflects the personality of the user more or less. Needless to say, it may also be possible without any condition setting unit to generate an object that more realistically reflects the personality of a user.

Meanwhile, as a modified example of the present embodiment, the time frame selecting unit 170 and the attribute selecting unit 172, which are condition setting units, may set a generating condition in accordance with a situation in which an object generated by the object generating unit 162 is displayed. For example, the condition setting unit may set a generating condition of an object in accordance with an attribute of a community site in which the object is displayed. For example, when an object is displayed in a community site a theme of which is sports, the attribute selecting unit 172 may automatically select an attribute score relating to "sports." In addition, for example, when an object is displayed a community site for a school reunion, the time frame selecting unit 170 may automatically select a time frame in which a user was a student at school. This allows objects matching with the properties of communication places in virtual space to be displayed at each place.

The schematic functional configuration of the system according to the first embodiment of the present disclosure has been described so far. Next, specific examples will be described for processes for displaying an object and generating an object, and data used therefor in the system.

(1-2. Example of Process)

Figure 2:
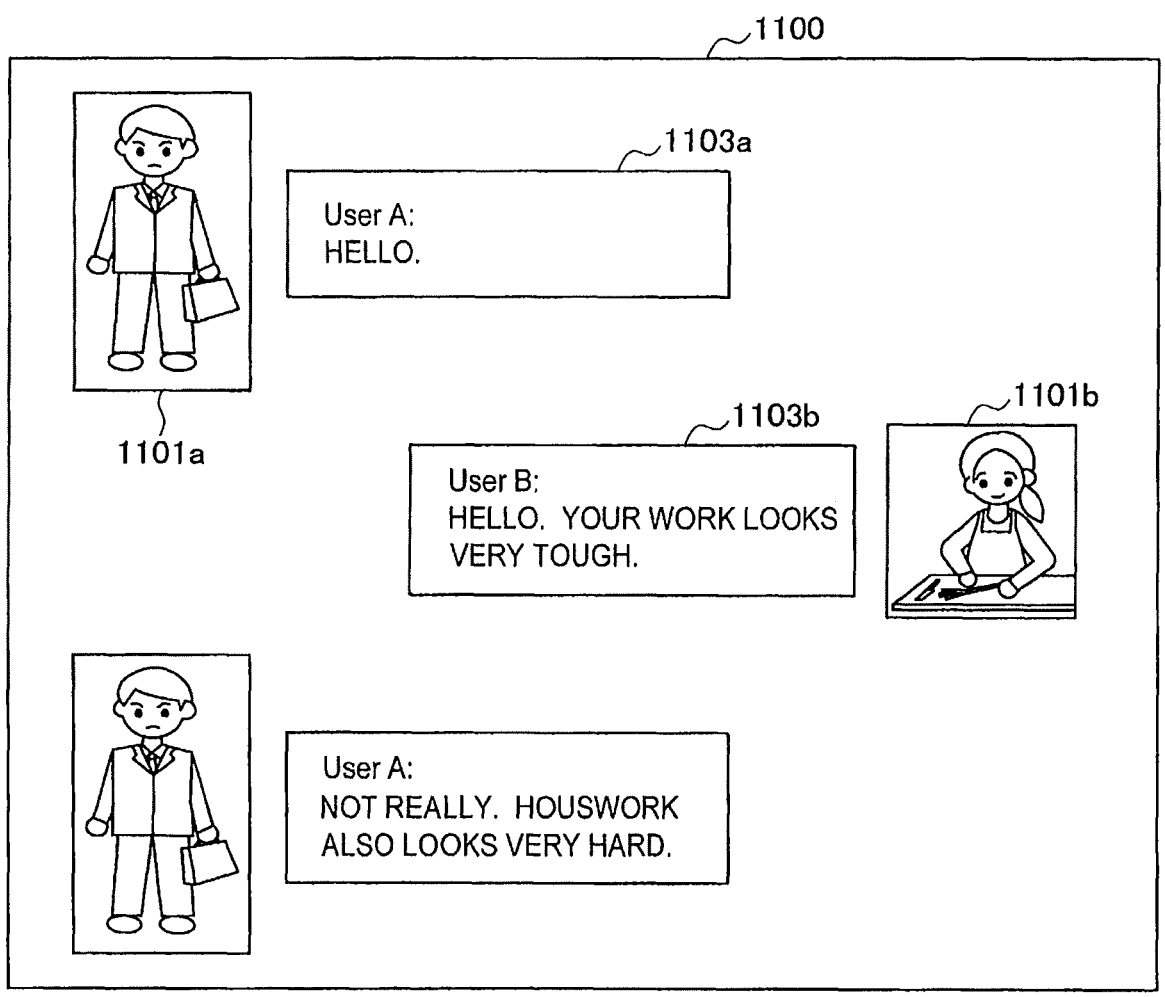
FIG. 2 is a diagram illustrating an example in which an object is displayed in the system according to the first embodiment of the present disclosure.

FIG. 2 is a diagram illustrating an example in which an object is displayed in the system according to the first embodiment of the present disclosure. FIG. 2 illustrates a situation in which a user A has a conversation with a user B in virtual space. Avatars 1101 and dialogues 1103 are displayed on a screen 1100. Here, the avatars 1101 include an avatar 1101a of the user A and an avatar 1101b of the user B, while the dialogues 1103 include a dialogue 1103*a* of the user A and a dialogue 1103*b* of the user B.

Here, the avatars 1101 are objects generated by the object generating unit 162 of the server 150. The avatar 1101*a* of the user A is generated on the basis of an attribute score for "work," and takes a form of a user who is in a suit and has a bag. This allows the conversation partner or user B to recognize that the user A is a person who chiefly works at a job.

Meanwhile, the avatar 1101*b* of the user B is generated on the basis of an attribute score for "housework," and takes a form of a user who is cooking at home. This allows the user A to recognize that the user B is a person who chiefly does housework. Thus, the conversation between both users easily has topics such as "your work looks very tough" and "housework also looks very hard," so that the conversation is expected to be more natural and smooth.

Figure 3:
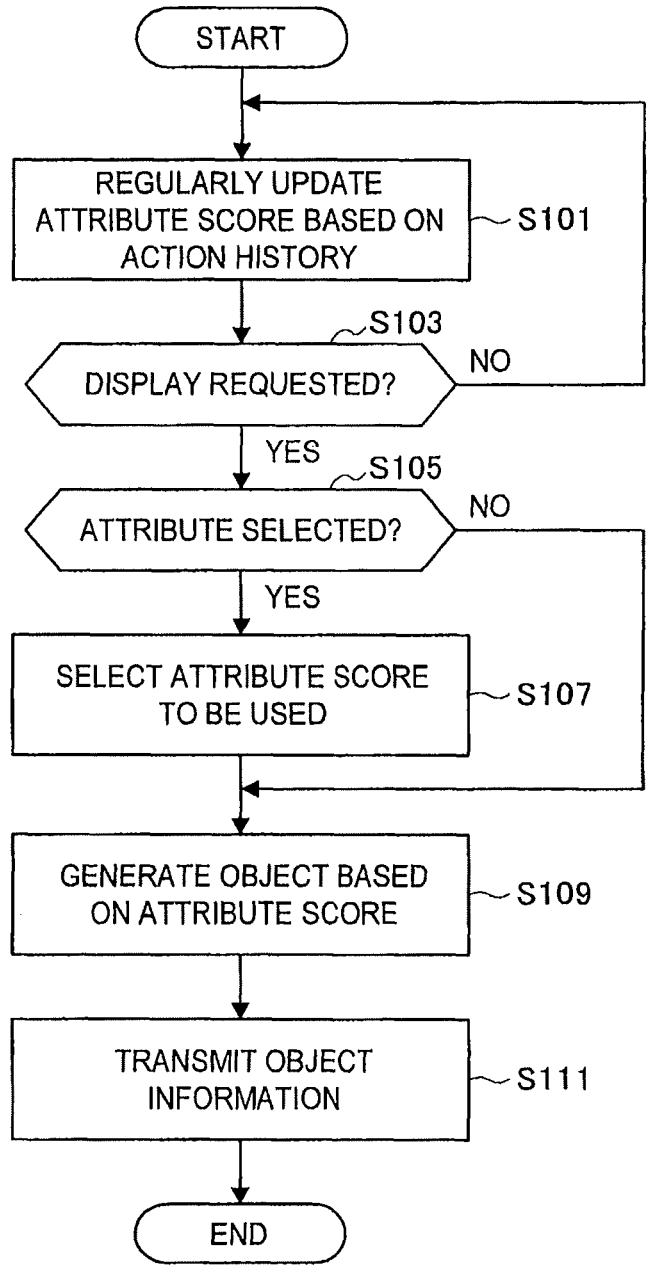
FIG. 3 is a flowchart illustrating an example of a process for implementing display as illustrated in FIG. 2.

FIG. 3 is a flowchart illustrating an example of a process for implementing display as illustrated in FIG. 2. First of all, the attribute score calculating unit 158 regularly updates an attribute score of a user stored in the attribute DB 160 on the basis of an action history acquired by the action history acquiring unit 156 in the server 150 (step S101). Here, when the activation of an application, for example, as illustrated in FIG. 2 or the like requests an object to be displayed (step S103), a process for generating an object is executed in the server 150.

First of all, if the attribute selecting unit 172 selects some attribute (step S105), the attribute score calculating unit 158 selects an attribute score in accordance with the selection before reading out the attribute scores stored in the attribute DB 160 (step S107). Additionally, the selection of an attribute here may be based on, for example, an operation of a user and a situation in which an object is displayed (a situation in which a conversation as illustrated in FIG. 2 is made). When no attribute is selected, all of the calculated attribute scores are used.

Next, the object generating unit 162 generates an object on the basis of the attribute score read out from the attribute DB 160 (step S109). The object generating unit 162 then transmits information on the object to the client 100 via the communication unit 168 (step S111). At that time, the object generating unit 162 may transmit the information on the object as part of data for displaying, for example, the screen 1100 illustrated in FIG. 2. An image including an object that represents a user is done in the client 100 through the above-described processes.

(1-3. Example of Data)

FIG. 4 is a diagram illustrating an example of data used in the first embodiment of the present disclosure. The illustrated example shows an example of data used for generating objects for six users A to F. Each item of the data will be described, and "sex" and "occupation" are registered information on the users and stored in the user DB 166, for example. "Workplace" and "home" are attributes set for positional histories of the users, and attribute scores are calculated in accordance with the length of a time for which the users have stayed at the respective places. "Sitting," "walking," "running," "eating," and "shopping" are attributes set for action states of the users, and attribute scores are calculated in accordance with the length of a time of the users for the respective actions. The respective attribution scores are normalized in the illustrated example, and it is possible to compare the attribution scores with each other. Meanwhile, "department store," "supermarket," and "bookstore" are attributes into which an attribute "shopping" is further subdivided, and attribute scores are calculated in accordance with how many times the users have done their shopping at each type of store, or how much money the users have spent. As this example of "shopping" shows, an attribute may have a hierarchical structure. These attribute scores are calculated by the attribute score calculating unit 158 on the basis of action histories of the users.

The object generating unit 162 generates objects that represent the users, on the basis of data as described above. When no generating condition is set, the object generating unit 162 may reference all of the calculated attribute scores to generate objects. In this case, for example, the object generating unit 162 compares the attribute scores for the respective attributes to generate an object for the highest attribute.

For example, "workplace" has the highest attribute score for the user A and the user B. Accordingly, the object generating unit 162 selects information on an object corresponding to the attribute "workplace" from information on objects stored in the object DB 164. Furthermore, when several pieces of information on the object have been prepared in accordance with sex, occupation, and the like, the object generating unit 162 selects information on an object that matches with the sex and occupation of the user A and the user B, which namely means an object that matches with a male office worker. As a result of these processes, for example, an avatar 1101*c* of a man who is in a suit and has a bag is generated as an object. Here, for example, if the user A and the user B are farmers by occupation and information on an object corresponding thereto is stored in the DB 164, another avatar of a man who has a straw hat on and has a hoe may, for example, be generated.

In the same way, although "workplace" has the highest attribute score for the user C and the user D, the object generating unit 162 generates, as an object, an avatar 1101*d* of a woman who is in a suit because the user C and the user D are female. Meanwhile, "home" has the highest attribute score for the user E and the user F. Accordingly, the object generating unit 162 selects information on an object corresponding to the attribute "home" from information on objects stored in the object DB 164. In addition, since the user E and the user F are female, the object generating unit 162 generates, as an object, an avatar 1101*e* of a woman who is cooking at home.

Additionally, although the object generating unit 162 generates an object on the basis of an attribute that has the highest attribute score in the example, an embodiment of the present disclosure is not limited to such an example. For example, the object generating unit 162 may acquire information on objects corresponding to a plurality of attributes that have relatively high attribute scores from the object DB 164, and generate an object by combining the acquired information in accordance with the respective attribute scores.

For example, the users A to D are common in that "workplace" has the highest attribute scores, but the users A to D are different in that "walking" has relatively high attribute scores for the user B and the user C, while "walking" has relatively low attribute scores for the user A and the user D. For example, the object generating unit 162 may generate, as objects, an avatar of a man or a woman who is walking in a suit for the user B and the user C, and an avatar of a man or a woman who is sitting in a suit for the user A and the user D, in order to reflect that difference on the objects.

In this way, generating an object on the basis of attribute scores for a plurality of attributes allows an attribute that matches with a user the best to be extracted and allows an object that corresponds to the attribute to be generated. Meanwhile, for example, when a user is an office worker, there is a possibility that another feature such as a feature "enjoying sports in his or her free time" is hidden, because "workplace" has a higher attribute score, which is calculated on the basis of a stay time. In that case, the time frame selecting unit 170 and the attribute selecting unit 172, which are additionally installed, set a generating condition of an object, so that it becomes possible to generate an object that, for example, reflects the individuality of a user more. An example will be further described below in which an object is generated in accordance with such a generating condition.

(1-4. Example of Object Generating Condition)

FIG. 5 is a diagram illustrating a first example in which an object generating condition is set in the first embodiment of the present disclosure. A generating condition that can be also referred to as "exercise filter" is set in the illustrated example in order to generate an object on the basis of data as illustrated in FIG. 4. More specifically, the attribute selecting unit 172 selects attribute scores for "sitting," "walking," and "running," which relate to exercise situations of the users, as attribute scores to be emphasized for generating an object.

In this case, the object generating unit 162 generates an object by emphasizing the selected attribute score. Thus, an avatar 1101f of a plump man is generated as an object for the user A in the illustrated example, who has a high attribute score for "sitting," and is estimated to frequently act with low calorie consumption. Meanwhile, an avatar 1101g of a slim man is generated as an object for the user B, who has relatively high attribute scores for "walking" and "running," and is estimated to frequently act with high calorie consumption.

Setting such a generating condition makes a difference between the user A and the user B in terms of "whether to frequently have exercise," although there is no apparent difference as a whole because both of the user A and the user B are "persons who chiefly work at a job." For example, when the user B is confident that the user B frequently has exercise and the user B would like to express the user B himself, who frequently have exercise, in an object such as an avatar in virtual space, the user B may simply set the "exercise filter" via the attribute selecting unit 172.

Additionally, even if such a filter-type generating condition is set, an attribute score that has not selected by the filter may be reflected on the generation of an object to some extent. For example, the avatars 1101f and 1101g do not necessarily have to put on training wears in the example of FIG. 5, but may be in suits on the basis of the fact that, for example, "workplace" has the highest attribute score among the attribute scores that have not selected.

Figure 6:
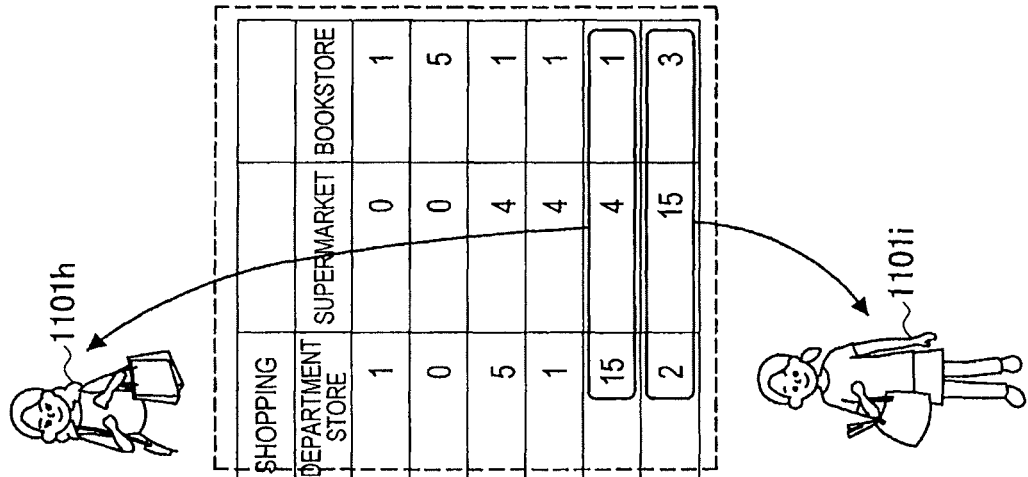
FIG. 6 is a diagram illustrating a second example in which an object generating condition is set in the first embodiment of the present disclosure.

FIG. 6 is a diagram illustrating a second example in which an object generating condition is set in the first embodiment of the present disclosure. A generating condition that can be also referred to as "shopping filter" is set in the illustrated example in order to generate an object on the basis of data as illustrated in FIG. 4. More specifically, the attribute selecting unit 172 selects attribute scores for "department store," "supermarket," and "bookstore," which relate to how the users do shopping, as attribute scores to be emphasized for generating an object.

As in the example of FIG. 5, the object generating unit 162 generates an object on the basis of the selected attribute score. Thus, an avatar 1101h of a woman who is well dressed and has a shopping bag of the department store is generated as an object for the user E, who has a high attribute score for "department store" in the illustrated example. Meanwhile, an avatar 1101i of a woman who is casually dressed and has a plastic bag from which a green onion pokes up is set as an object for the user F, who has a high attribute score for "supermarket."

Setting such a generating condition makes a difference between the user E and the user F in terms of "where to do shopping," although there is no apparent difference as a whole because both of the user E and the user F are "housewives who are chiefly at home." For example, when their avatars are displayed in a site to which reviews for products are posted, the attribute selecting unit 172 automatically sets a "shopping filter" in accordance with an attribute of the site, which allows reviews to be viewed by showing where users who have posted the review frequently do shopping.

Figure 7:
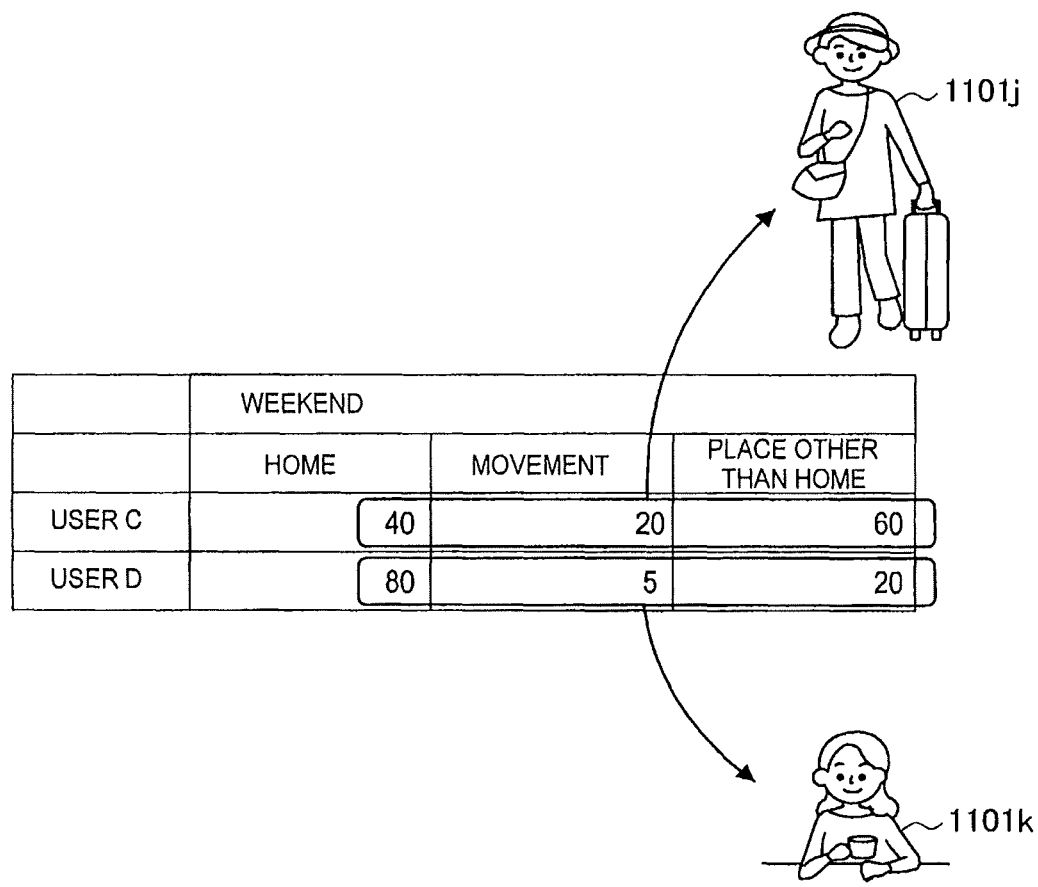
FIG. 7 is a diagram illustrating a third example in which an object generating condition is set in the first embodiment of the present disclosure.

FIG. 7 is a diagram illustrating a third example in which an object generating condition is set in the first embodiment of the present disclosure. A generating condition that can be also referred to as "weekend filter" is set in the illustrated example in order to generate an object on the basis of data as illustrated in FIG. 4. More specifically, the time frame selecting unit 170 selects "weekend" as a time frame in which an action history is emphasized for generating an object. The figure illustrates attribute scores for "home," "movement," and "place other than home," which are calculated for "weekend." These attribute scores are calculated, for example, in accordance with the length of a time for which positional information on a user is satisfying a condition for each attribute. In addition, these scores are also normalized, and can be compared with each other.

The object generating unit 162 generates an object on the basis of an attribute score calculated on the basis of action history information in the selected time frame in the illustrated example. In this case, for example, an avatar 1101j of a woman who has a travelling bag is generated as an object for the user C, who is at a "place other than home" for a long time. Meanwhile, an avatar 1101k of a woman who is drinking tea at home is generated as an object for the user D, who is at "home" for a long time.

Setting such a generating condition makes a difference between the user C and the user D in terms of a "way to spend a weekend," although there is no difference between attribute data in all of the time frames illustrated in FIG. 4. A large number of users who do work at a job basically work on weekdays, so that the individuality does not tend to appear in terms of a way to spend time. Accordingly, if the "weekend filter" is set to generate objects, a variety of objects may be generated for the respective users.

Figure 8:
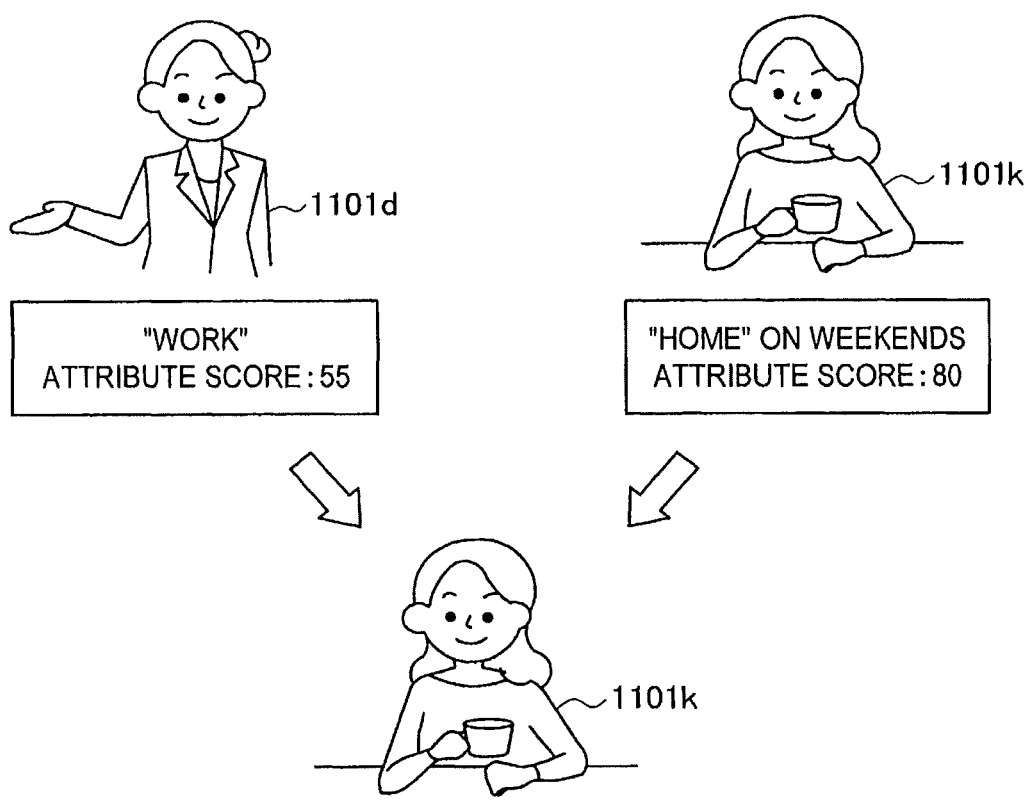
FIG. 8 is a diagram illustrating a modified example of the example of FIG. 7.

FIG. 8 is a diagram illustrating a modified example of the example of FIG. 7. Attribute scores calculated in accordance with a condition for a time frame as illustrated in the example of FIG. 7 may be compared with attribute scores calculated without any condition for a time frame as illustrated in the example of FIG. 4 or attribute scores calculated in accordance with a different condition in the present embodiment. In the illustrated example, the object generating unit 162 compares the highest attribute score (55) for "work" among the attribute scores calculated without any condition for a time frame with the highest attribute score (80) for "home" among the attribute scores calculated only in a time frame "weekend" for the user D illustrated in the examples of FIGS. 4 and 7, and generates an object in accordance with the higher attribute score. As a result, an avatar 1101k is generated as an object on the basis of the attribute score for "home" calculated for "weekend" for the user D.

For example, the most featured attribute score among the attribute scores of a user calculated in different target time frames may be selected through this comparison. For example, if the user D has no feature in particular about a way to spend weekends, but works harder on weekdays than anyone else, an avatar 1101d that is generated on the basis of an attribute score for "workplace" on weekdays may be selected irrespective of a "weekend filter." Meanwhile, if the user D works like others on weekdays, but spends time at home on weekends more frequently than anyone else, an avatar 1101k that is generated on the basis of an attribute score for "home" on weekends may be selected.

Such comparison may be carried out in accordance with a condition that is, for example, set by the time frame selecting unit 170 and the attribute selecting unit 172. Alternatively, the attribute score calculating unit 158 may attempt to calculate attribute scores in accordance with a variety of filtering patterns of time frames and attributes, thereby searching for a generating condition that can reflect the personality of a user on an object the most appropriately. The generating condition may be different for each user, for example.

(1-5. Example of Setting Object Step by Step)

FIG. 9 is a diagram illustrating an example of setting an object step by step in the first embodiment of the present disclosure. FIG. 9 illustrates an example of information that may be stored in the object DB 164 in the present embodiment. As discussed above, the object DB 164 may store information on a plurality of objects set in accordance with attribute scores for the same attribute, and the object generating unit 162 may select information on an appropriate object among them in accordance with attribute scores of users. For example, this makes it possible to express to what extent the items indicated by the attributes are applicable to the users. Additionally, the example illustrated in FIG. 9 does not correlate with the examples of FIGS. 4 to 8.

Information on objects are set step by step for three attributes "work," "shopping," and "train travel" in accordance with attribute scores in the illustrated example. For example, when the attribute "work" is set (e.g. an attribute score is set in accordance with a time for which a user stays at a workplace), attribute scores of 50 to 59 cause an avatar to wear a necktie. Attribute scores of 60 to 69 further cause an avatar to wear a suit. Attribute scores of 70 to 99 cause an avatar to sweat in order to express that the user is a hard worker. Furthermore, an attribute score of 100 causes a halo to shine around an avatar in order to indicate that the user is a very hard worker and a great person.

In the same way, when the attribute "shopping" is set (e.g. an attribute score is set in accordance with a time for which a user stays in a department store), an avatar carries more shopping bags with an increase in an attribute score. Furthermore, the building of the department store appears in the background, and the avatar is finally accompanied by an attendant who carries baggage for the avatar. When the attribute "train travel" is set (e.g. an attribute score is set in accordance with a time for which a user is moving on the train), an avatar is provided with items that most rail-fans have one after another with an increase in an attribute score. Additionally, there may be pieces of information on an object set at each step of an attribute score. For example, pieces of information on an object may be set at each step of attribution scores. In this case, it may be decided, for example, on the basis of an operation of a user which of objects the user selects at the corresponding step of attribute scores.

In this way, in addition to qualitative information on what attribute the user has, generating an object that changes step by step in accordance with attribute scores can reflect, on an object, quantitative information on how strong the attribute of the user is. In addition, as described in the example, if an object generated in accordance with attribute scores has play to some extent, an actual action of a user may be motivated (e.g. "I am busy this week after all, so I will work hard until a halo shines around the avatar," etc.).

As a modified example that has a similar property to the property of the above-described example, an attribute indicating whether a user has achieved a predetermined event is defined in the attribute DB 160. In this case, the attribute score calculating unit 158 determines whether the user has achieved the event, on the basis of action history information. For example, if the user has achieved the event, an attribute score is set to 1, and if not, an attribute score is set to 0. Furthermore, the object generating unit 162 may generate a special object indicating that an event has been achieved for a user for whom an attribute score of 1 is set for the attribute on the basis of information stored in the object DB 164.

Examples of events include "a moving distance in a day reaches just 30 km," "a user is the first to come in the company in the morning in three straight days," "a user does shopping in a store a hundred times or more," "a user passes by a store once a day or more while the store is open," "a user acts in a certain way at certain time on a certain day (e.g. a user is on the twelfth floor of a building at 12:12 on Dec. 12, 2012)," and "a user used to visit a certain store a year or more before, but has not visited the store for the last year." These events and objects corresponding to the events may be, for example, set for users simply for fun, or may be used for marketing in combination with embodiments for displaying the objects on a map, which will be discussed below.

(1-6. Modified Examples for Functional Configuration)

Figure 10:
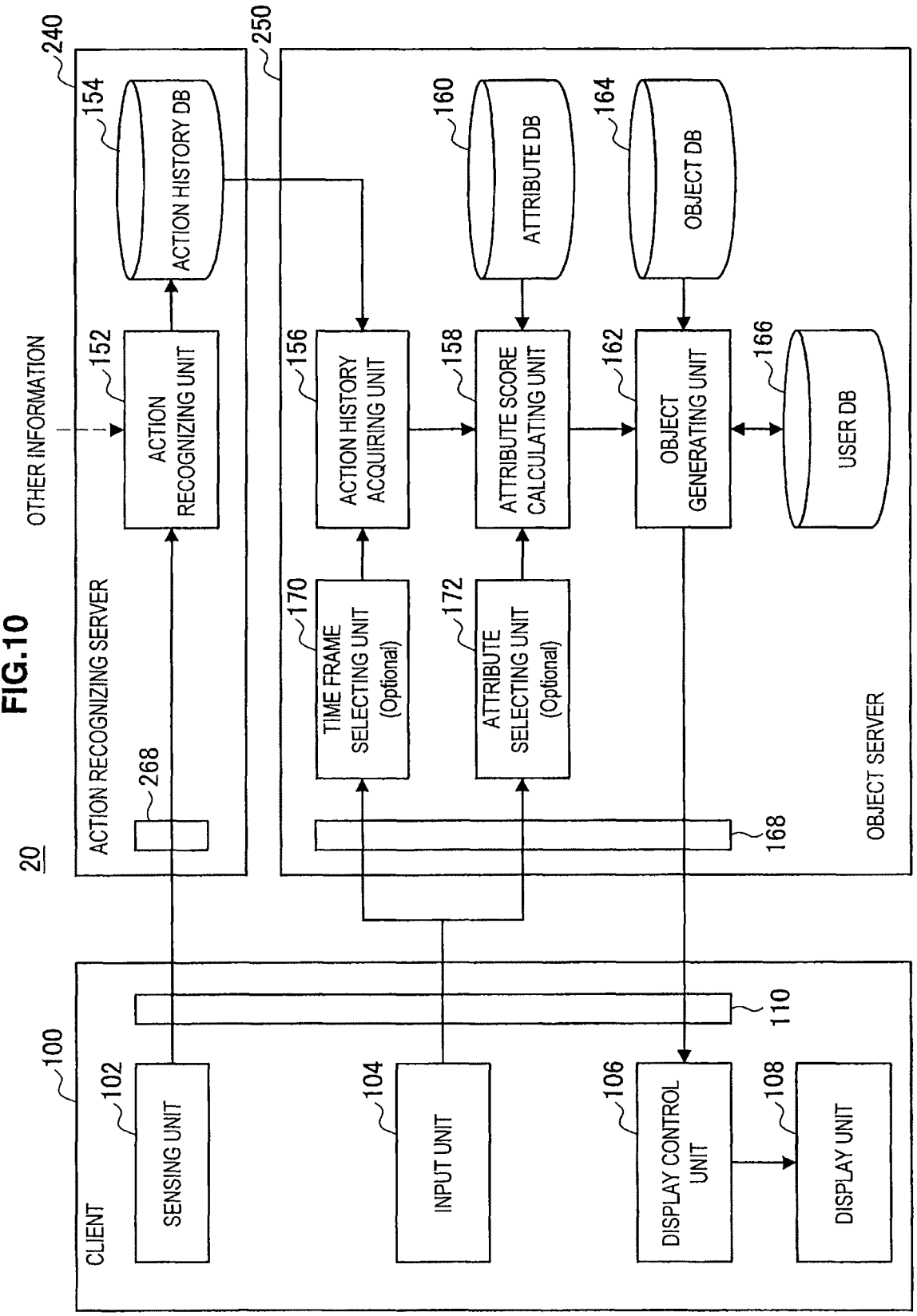
FIG. 10 is a block diagram illustrating a first modified example of a functional configuration in the first embodiment of the present disclosure.

FIG. 10 is a block diagram illustrating a first modified example of a functional configuration in the first embodiment of the present disclosure. FIG. 10 illustrates that a system 20 includes a client 100, an action recognizing server 240, and an object server 250. The client 100, the action recognizing server 240, and the object server 250 are connected to each other via a variety of wired or wireless networks, and communicate with each other as needed.

Here, the client 100 includes the same functional configuration as the functional configuration of the client 100 in the system 10. The action recognizing server 240 includes an action recognizing unit 152, an action history DB 154, and a communication unit 268 (identical to the communication unit 168 described with reference to FIG. 1). The object server 250 includes an action history acquiring unit 156, an attribute score calculating unit 158, an attribute DB 160, an object generating unit 162, an object DB 164, a user DB 166, and a communication unit 168, and additionally includes one or both of a time frame selecting unit 170 and an attribute selecting unit 172.

As illustrated in this example, the action recognizing server 240 and the object server 250 are two servers that distribute and implement the function of the server 150 in the example of FIG. 1. As discussed above, the server 150 is implemented as a single information processing device or a plurality of information processing devices that operate in cooperation with each other, so that the action recognizing server 240 and the object server 250 can also be regarded as an example of the server 150, which is implemented as a plurality of information processing devices that operate in cooperation with each other. Needless to say, the action recognizing server 240 and the object server 250 may also be each implemented as a plurality of information processing devices that operate in cooperation with each other. In addition, the server 150 may be distributed and implemented as a plurality of information processing devices in a different form from the form illustrated in FIG. 10.

Figure 11:
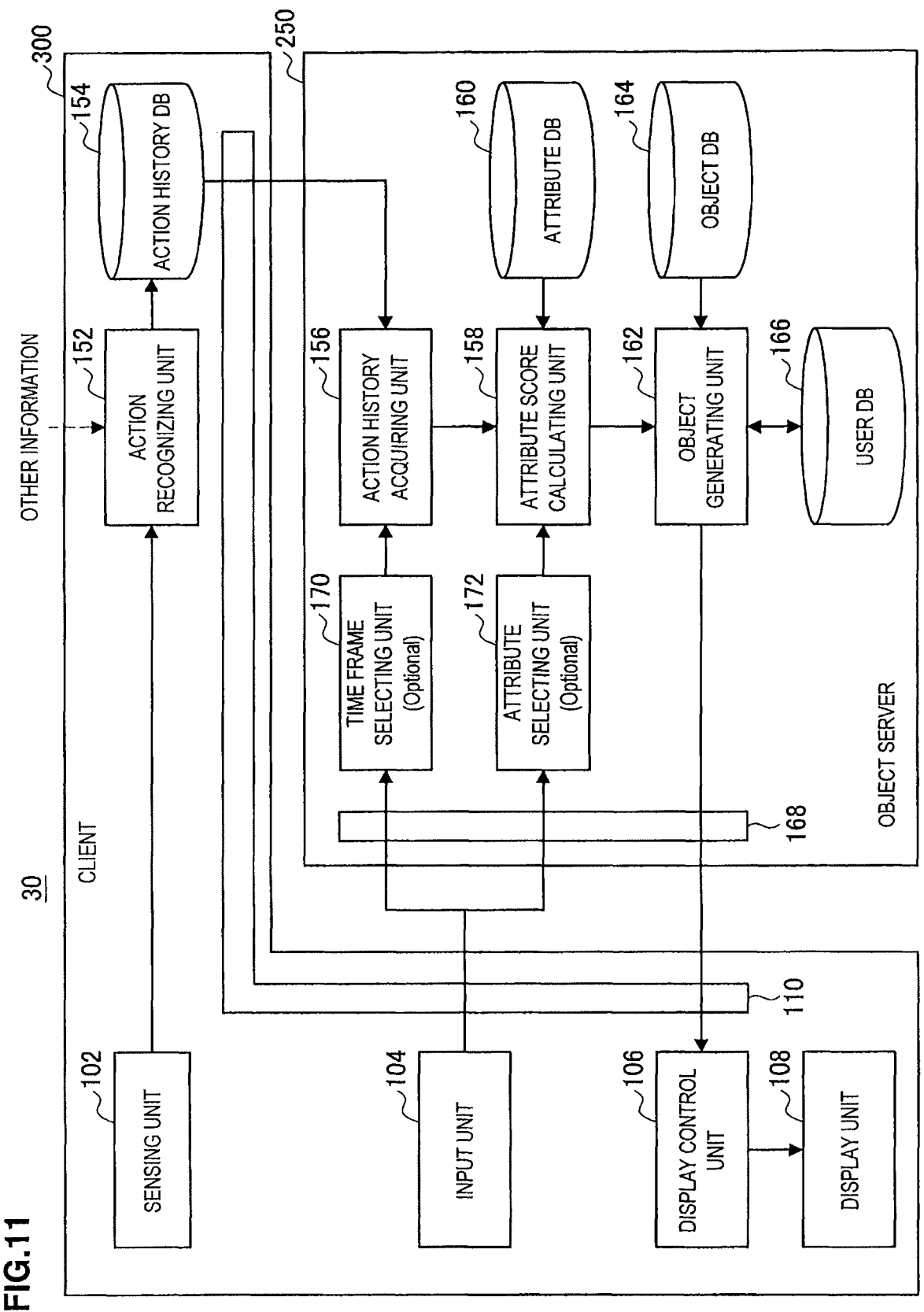
FIG. 11 is a block diagram illustrating a second modified example of the functional configuration in the first embodiment of the present disclosure.

FIG. 11 is a block diagram illustrating a second modified example of the functional configuration in the first embodiment of the present disclosure. FIG. 11 illustrates that a system 30 includes a client 300 and an object server 250. The client 300 and the object server 250 are connected to each other via a variety of wired or wireless networks, and communicate with each other as needed.

Here, the client 300 includes an action recognizing unit 152 and an action history DB 154 in addition to the functional configuration of the client 100 in the system 10. The object server 250 includes the same functional configuration as the functional configuration of the object server 250 described with reference to FIG. 10.

As illustrated in the figure, the action recognizing unit 152 and the action history DB 154 are incorporated into the client in the present modified example. For example, the client 300 may recognize an action of a user with the action recognizing unit 152 on the basis of a result sensing by an acceleration sensor or the like included in a sensing unit 102, and accumulate the result in an action history DB 154. In this case, the object server 250 acquires action history information in a predetermined time frame by accessing the action history DB 154 of the client 300, for example, regularly or when the client 300 requests an object that represents a user to be generated.

In this way, the functional configuration of the system according to the present embodiment may be disposed on any element on a network irrespective of a server or a client. Regarding this point, a variety of modified examples other than the above-described two modified examples can be implemented. For example, as in the two modified examples, if an action history acquiring unit 156 of the object server 250 is capable of acquiring action history information from an external action history DB 154, a provider that provides the object server 250 can acquire action history information with the action recognizing server 240 or the client 300 from another provider that provides an action recognizing service. In addition, action history information acquired through a plurality of action recognizing services may be merged and used. For example, a provider that provides the object server 250 may also provide an action recognizing service (consequently, the object server 250 may have a functional configuration as described for the server 150 illustrated in FIG. 1), further acquire action history information acquired through an action recognizing service of another provider, and use the acquired action history information for calculating an attribute score and generating an object.

2. Second Embodiment

Next, a second embodiment of the present disclosure will be described with reference to FIGS. 12 and 13. This second embodiment is different from the first embodiment in that an object representing a user is an object to be superimposed on an actual image of the user. Additionally, the others such as the functional configuration are the same as those of the first embodiment, so that the repeated detailed description will be omitted.

Figure 12:
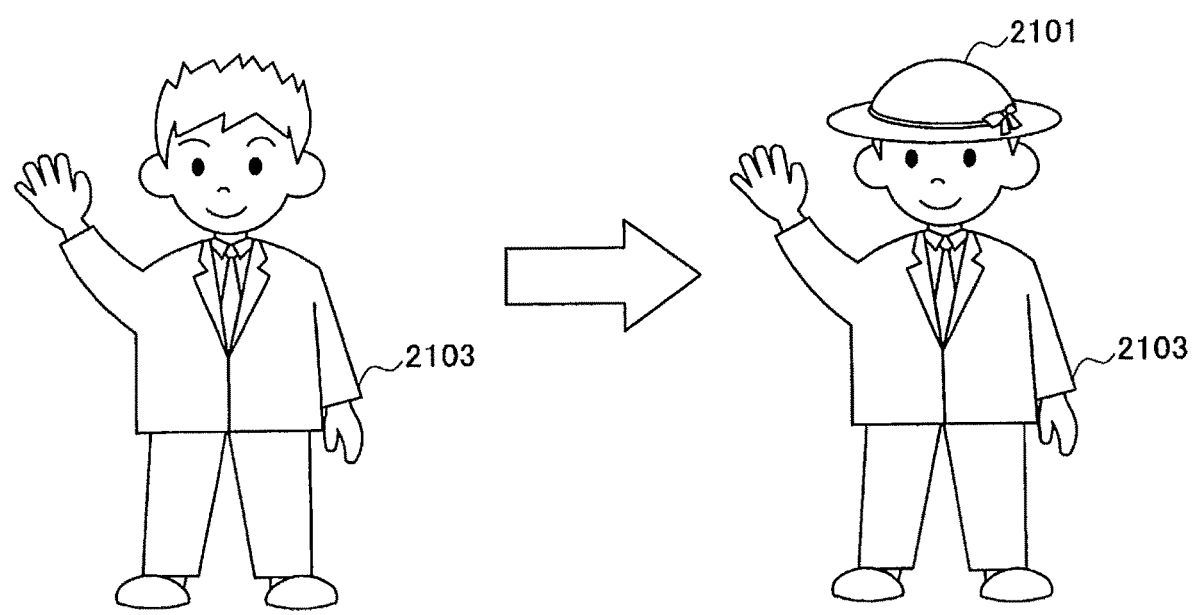
FIG. 12 is a diagram illustrating a first display example in a second embodiment of the present disclosure.

FIG. 12 is a diagram illustrating a first display example in the second embodiment of the present disclosure. An object 2101 generated by the object generating unit 162 of the server 150 is superimposed on an actual image 2103 of a user in the present embodiment. A male user who is in a suit is displayed as the actual image 2103, and an object 2101 of a straw hat is superimposed thereon in the illustrated example. The object 2101 may, for example, indicate that the user is now in a suite and works at a job, but the user is busy in a kitchen garden on weekends. In this way, objects are not limited to avatars displayed in virtual space, but may be objects of clothing, accessories, hair styles, pets, and the like displayed along with an actual image of a user.

Here, the actual image 2103 of a user is visually recognized, for example, as an image obtained by shooting an image of real space provided in an AR application or the like, and an image of real space seen through a see-through display unit. The object generating unit 162 or the display control unit 106 of the client 100 recognizes the position and posture of the actual image 2103 of a user, and displays the object 2101 in accordance with them. Additionally, when such display is performed, a user for whom an object is generated may be different from a user who observes the displayed object.

Figure 13:
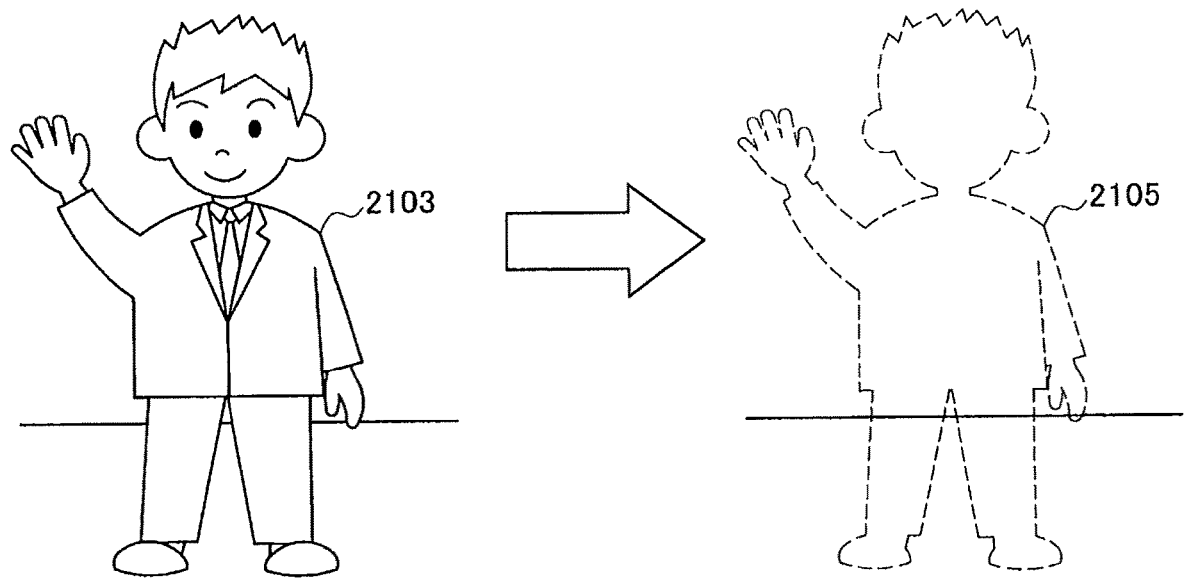
FIG. 13 is a diagram illustrating a second display example in the second embodiment of the present disclosure.

FIG. 13 is a diagram illustrating a second display example in the second embodiment of the present disclosure. As with the example of FIG. 12, a male user who is in a suit is displayed as an actual image 2103 in the illustrated example. An object 2105 is, for example, an environmental object that displays the background of the actual image, and the display of the object 2105 hides the actual image 2103 of the user. The object 2105 may be generated on the basis of an attribute score when it is indicated that the user does not satisfy a predetermined condition. For example, when a user who views the image sets a condition "person who frequently does sports," a user for whom an attribute score indicates that the user does not frequently do sports superimposes the object 2105 to disappear from the sight of the user who views the image.

For example, when a user searches for a partner user to address in an event site where a large number of users gather, such display is effective in recognizing which user satisfies the desired condition to facilitate communication after addressing the user. Even in this case, it can be said that the object 2105 reflects the personality of the user that the user does not satisfy a predetermined condition.

3. Third Embodiment

Next, a third embodiment of the present disclosure will be described with reference to FIGS. 14 to 19. This third embodiment is different from the first embodiment in that an object representing a user is displayed on a map, and it is possible to execute some function on that display. Additionally, the others are the same as those of the first embodiment, so that the repeated detailed description will be omitted.

(3-1. Functional Configuration)

Figure 14:
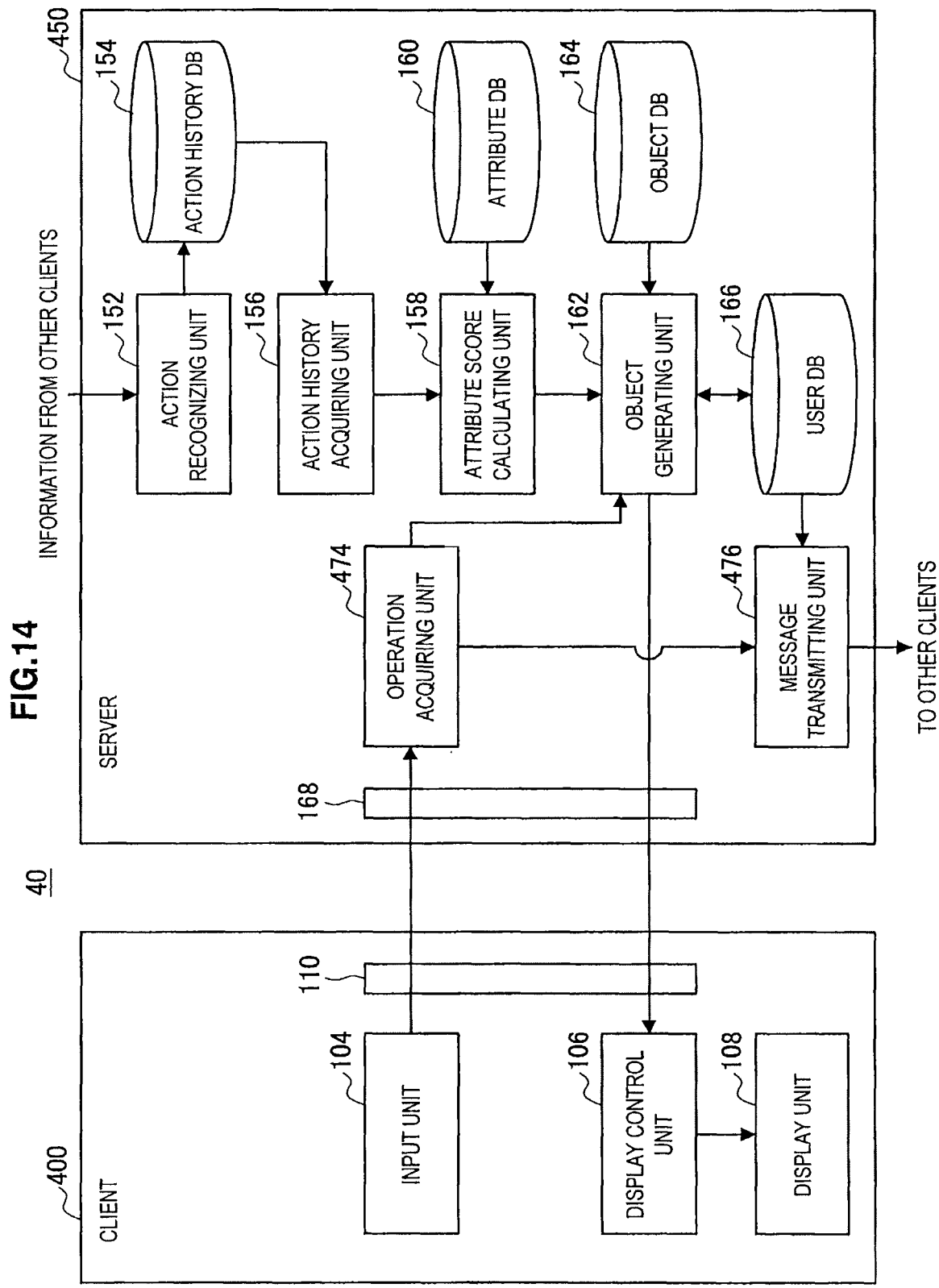
FIG. 14 is a block diagram illustrating a schematic functional configuration of a system according to a third embodiment of the present disclosure.

FIG. 14 is a block diagram illustrating a schematic functional configuration of a system according to a third embodiment of the present disclosure. FIG. 14 illustrates that a system 40 includes a client 400 and a server 450. The client 400 and the server 450 are connected to each other via a variety of wired or wireless networks, and communicate with each other as needed. The configuration of each of the client 400 and the server 450 will be further described below.

(Client)

The client 400 is different from the client 100 described with reference to FIG. 1 in that the client 400 does not include any sensing unit 102, but is the same as the client 100 in the other respects. The client 400 does not transmit a result of sensing to the server, and is used mainly by a user who observes an image including an object generated for another user. Accordingly, the client 400 includes an input unit 104, a display control unit 106, and a display unit 108. The detailed description for this functional configuration will be omitted because the client 100 has also the same functional configuration.

(Server)

The server 450 is different from the server 150 described with reference to FIG. 1 in that the server 450 includes an operation acquiring unit 474 and a message transmitting unit 476, but is the same as the server 150 in the other respects. The server 450 may include one or both of a time period selecting unit 170 and an attribute selecting unit 172, which is not, however, illustrated in the figure.

Since the client 400 does not transmits a result of sensing to the server in the illustrated example, an action recognizing unit 152 of the server 450 recognizes, on the basis of information from other clients different from the client 400, an action of a user who uses the other clients. Thus, action history information stored in an action history DB 154 is action history information on a user different from the client 400, and an object generated through processes of an action history acquiring unit 156, an attribute score calculating unit 158, and an object generating unit 162 represents a user different from a user of the client 400.

That is to say, an object generated for another user in the server 450 is displayed on the client 400, and the system 40 is a system for a user of the client 400 to execute some operation on the display. The functions of the operation acquiring unit 474 and the message transmitting unit 476 included in the server 450 in the system 40 will be further described below. Additionally, both of the operation acquiring unit 474 and the message transmitting unit 476 are implemented, for example, by a CPU operating in accordance with a program stored in a memory.

The operation acquiring unit 474 receives information from the input unit 104, which has acquired an operation of a user in the client 400, via a communication unit 168. The information received here may, for example, be information indicating an operation of specifying at least a part of objects (objects generated by the object generating unit 162) displayed on a map, as shown in an example discussed below. The type of object to be specified may further be specified in this operation information. The operation acquiring unit 474 provides the acquired information to the message transmitting unit 476. In addition, the operation acquiring unit 474 may acquire a request for displaying an object on a map. This request may include, for example, the type of object to be displayed, positional information on the client 400, and the like. This information may be provided to the object generating unit 162.

The message transmitting unit 476 is an example of a functional unit that executes a predetermined function in accordance with information acquired from the operation acquiring unit 474. The message transmitting unit 476 transmits a message to a user corresponding to an object on a map in the illustrated example, the object being specified in accordance with the operation information acquired by the operation acquiring unit 474. A destination to which the message is transmitted may be at least a part of clients that has provided information for recognizing an action, for example, to the action recognizing unit 152. The message transmitting unit 476 may reference a user DB 166 in order to acquire information on a destination to which the message is transmitted.

(3-2. Example of Process)

FIG. 15 is a diagram illustrating an example of data used in the third embodiment of the present disclosure. The illustrated data may be stored, for example, in the user DB 166 in the server 450. This data includes items "object type," "present position," and "E-mail" for respective users (users A to D). "Object type" has the type of object recorded thereon, the object being generated by the object generating unit 162 and associated with each user. "Present position" has positional information on each user recorded thereon, for example, in a latitudinal and longitudinal form, the positional information being detected with a GPS and the like. "E-mail" has an e-mail address recorded thereon, the e-mail address being, for example, registered by each user for use of a service.

An object type "businessperson" (e.g. a type of object generated for a user having a relatively high attribute score for work) is recorded for a user A and a user D, an object type "gorgeous" (e.g. a type of object generated for a user having a relatively high attribute score for luxury shopping) is recorded for a user B, and an object type "sportsperson" (e.g. a type of object generated for a user having a relatively high attribute score for sports) is recorded for a user C in the illustrated example. Additionally, these object types may be decided, for example, on the basis of all of the attribute scores for the users, or decided as a result after a user sets some condition with the time frame selecting unit 170, the attribute selecting unit 172, or the like.

Figure 16:
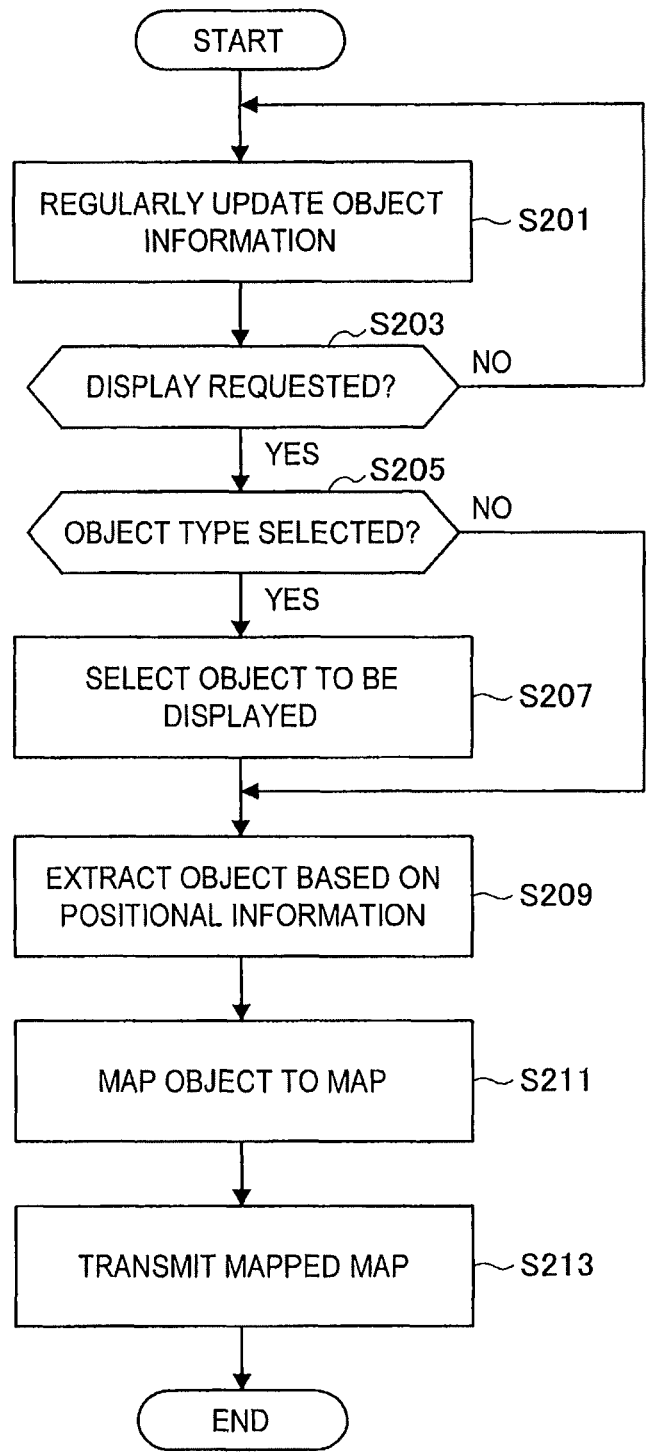
FIG. 16 is a flowchart illustrating an example of a process in the third embodiment of the present disclosure.

FIG. 16 is a flowchart illustrating an example of a process in the third embodiment of the present disclosure. First of all, the object generating unit 162 regularly updates object information on a user stored in the user DB 166 on the basis of an attribute score calculated by the attribute score calculating unit 158 in the server 450 (step S201). This also updates, for example, the items in "object type" illustrated in FIG. 15. Here, when the client 400 requests an object to be displayed (step S203), a process for displaying the object is executed in the server 450.

An object is generated by the object generating unit 162 in advance, and object information is stored in the user DB 166 in the present embodiment. Thus, a process for displaying an object begins with a process for the object generating unit 162 to select which user's object is displayed on the basis of information on an object type stored in the user DB 166 (step S207), if there is a choice of an object type to be displayed in response to the display request (step S205). As in the example of FIG. 3, a process may be executed for the attribute score calculating unit 158 to calculate an attribute score or to read out an attribute score, and furthermore, a process may be executed for the action history acquiring unit 156 to acquire an action history in the other embodiments.

Next, the object generating unit 162 extracts an object to be displayed on the basis of positional information on the client 400 included in the display request (step S209). The object extracted here is limited to an object of a target type, when a type of object was selected in step S207. Otherwise, an object is extracted irrespective of the type.

Next, the object generating unit 162 maps the extracted object to a map on the basis of positional information on the corresponding user stored in the user DB 166 (step S211), and transmits information on the map to which the object has been mapped to the client 400 (step S213). Here, the map to which an object is mapped is set on the basis of the positional information on the client 400 included in the display request.

(3-3. Display Example)

Figure 17:
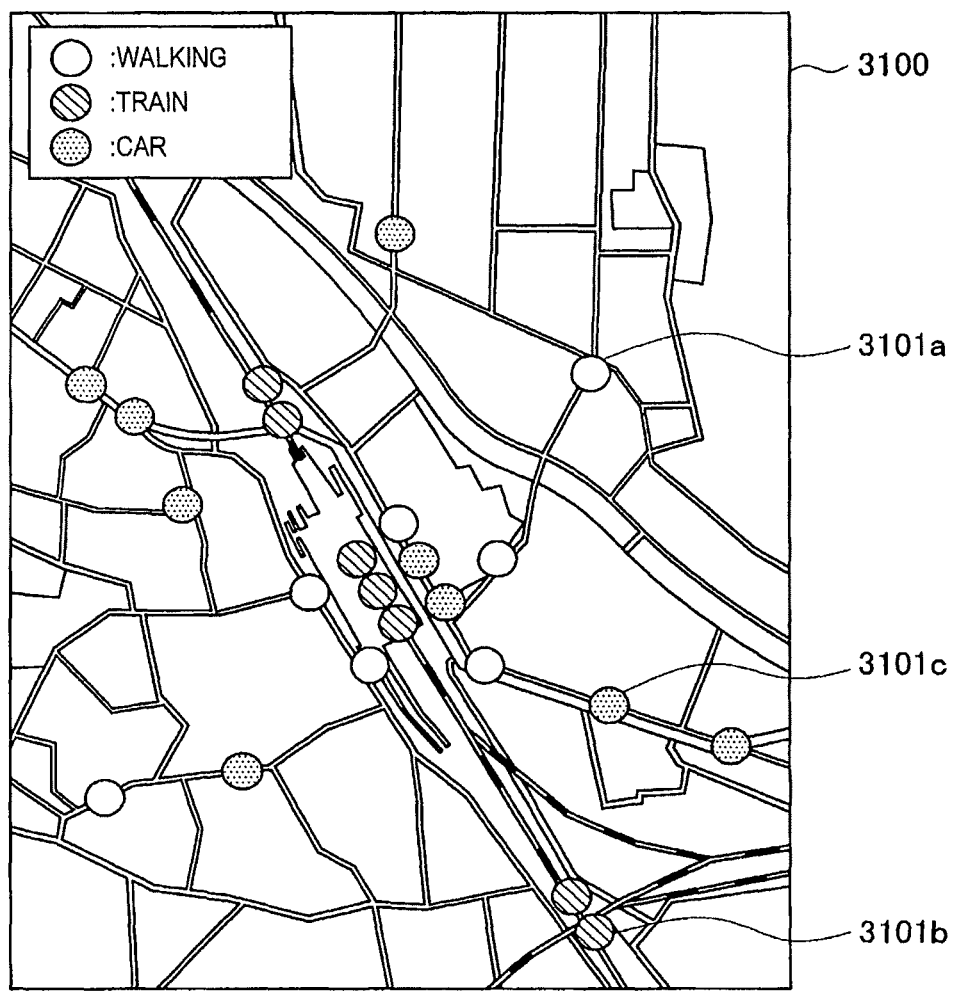
FIG. 17 is a diagram illustrating a first display example in the third embodiment of the present disclosure.

FIG. 17 is a diagram illustrating a first display example in the third embodiment of the present disclosure. The display unit 108 of the client 400 displays objects 3101 representing users on a map 3100 in the illustrated example. Here, the colors of the objects 3101 change in accordance with attribute scores of the users. That is to say, objects different in color are generated for an object 3101a (object of object type "walking") of a user for which a score for "walking" is calculated as an attribute score indicating the current action, and an object 3101b (object of object type "train") of a user for which a score for "train" is calculated in the same way, and an object 3101c (object of object type "car") of a user for which a score for "car" is calculated in the same way. As illustrated in the figure, the objects generated in this example has an abstract figure or circle, and even in this case, it is possible to display information (what means is used for movement in this case) on the personalities of the users by changing the colors, for example, in accordance with the attribute scores.

Figure 18:
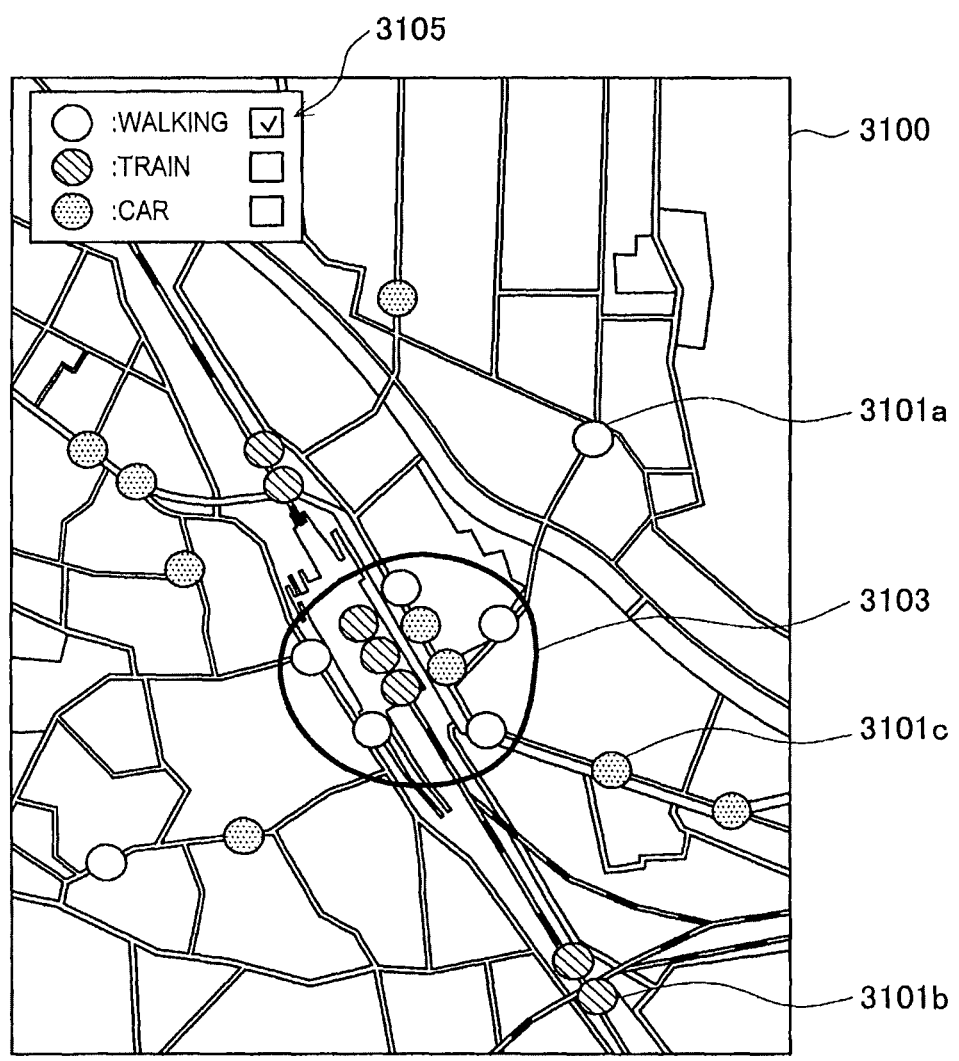
FIG. 18 is a diagram illustrating a second display example in the third embodiment of the present disclosure.

FIG. 18 is a diagram illustrating a second display example in the third embodiment of the present disclosure. When the client 400 displays objects 3101 on a map 3100 in the illustrated example as in the example of FIG. 17, a touch panel or the like included in the input unit 104 is used to input a range specifying FIG. 3103. In addition, to specify a target object type, selecting check boxes 3105 are displayed on a legend of objects, which allows for the selection with the input unit 104. A user positioned around the center of the map 3100 is specified by the range specifying FIG. 3103, and the check box 3105 limits targets to users who are displayed with an object type "walking" in, the illustrated example. This makes it possible, for example, to execute an operation such as delivering messages only to users who are positioned within a specified area and have a specified attribute.

The operation acquiring unit 474 then acquires information on an operation of a user which is displayed by depiction of the range specifying FIG. 3103 and selection of the check box 3105, and the message transmitting unit 476 executes a function such as transmitting a message in the server 450. Here, the message transmitting unit 476, for example, compares "present position" in the data illustrated in FIG. 15 with an area indicated by the range specifying FIG. 3103 on the map 3100 to extract a user who satisfies a positional condition. Furthermore, the message transmitting unit 476 compares "object type" with an object type specified by the check box 3105 to extract a user who satisfies a condition of an object type, and transmits a message to the address displayed as "E-mail" of the extracted user.

The above-described configuration, for example, makes it possible to extract a user having a certain attribute (indicated by an object type) from users at a certain place, and transmit a message to the extracted user with an intuitive and easy operation. Additionally, two or more attributes may be set. For example, when all the users for whom objects are displayed are limited to users who are "office worker" (limitation based on a first attribute) in the example of FIG. 18, an area near the station is further specified (limitation based on positional information) for the users, the users are further limited to users who are moving on foot (limitation based on a second attribute), and messages are transmitted to the limited users, which allows, for example, advertisement for lunches of a restaurant to be delivered only to users who are estimated as buyers.

(3-4. Modified Example)

Figure 19:
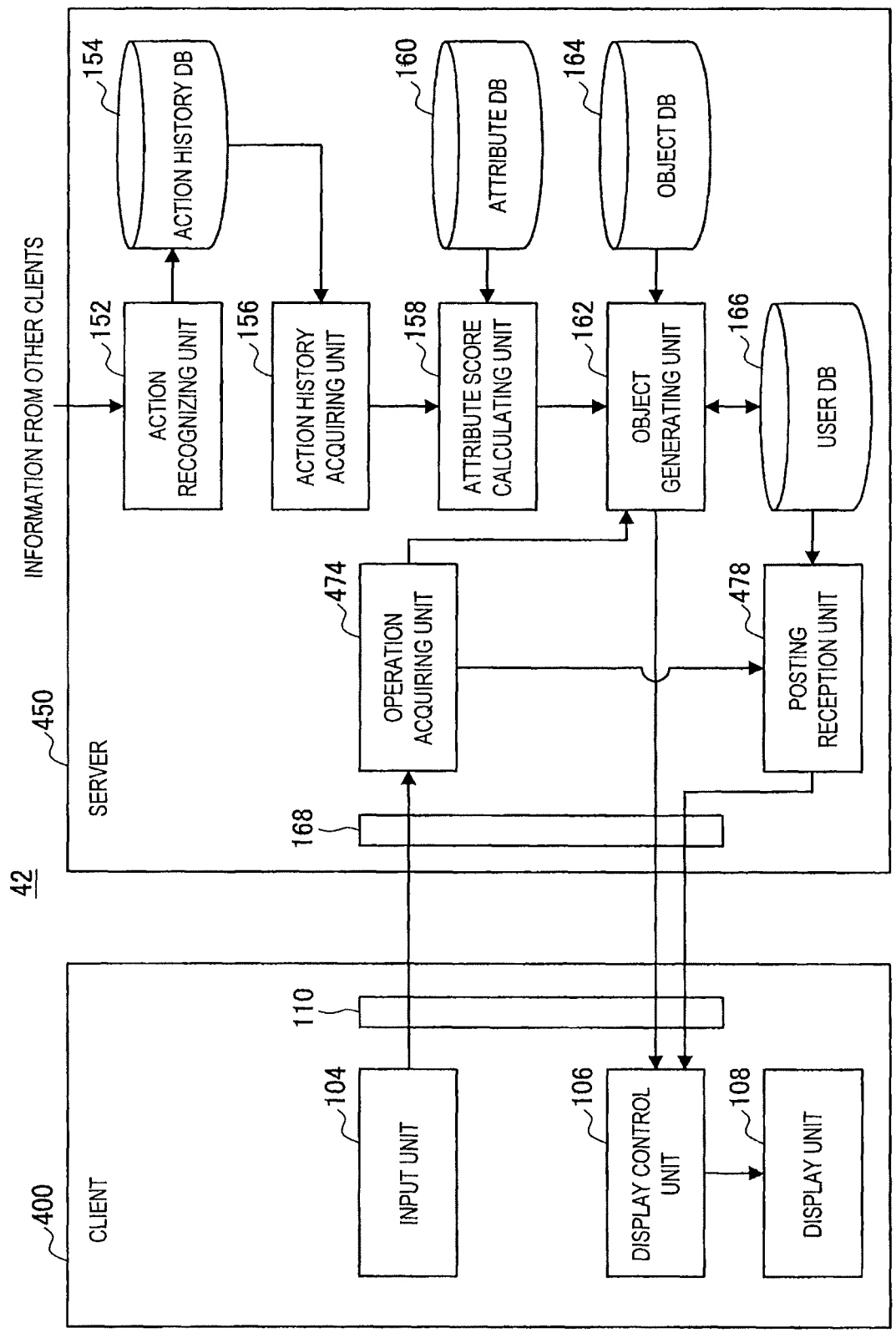
FIG. 19 is a block diagram illustrating a schematic functional configuration of a system according to a modified example of the third embodiment of the present disclosure.

FIG. 19 is a block diagram illustrating a schematic functional configuration of a system according to a modified example of the third embodiment of the present disclosure. FIG. 19 illustrates that a system 42 includes a client 400 and a server 450. The configuration of the system 42 is basically the same as the configuration of the system 40 according to the present embodiment described with reference to FIG. 14, but different therefrom in that the system 42 includes a posting reception unit 478 instead of the message transmitting unit 476 as a functional unit of the server 450.

The posting reception unit 478 is an example of a functional unit that executes a predetermined function in accordance with information acquired from an operation acquiring unit 474. The posting reception unit 478 receives a posting from a user on the basis of operation information acquired by the operation acquiring unit 474, and references object information stored in a user DB 166 to determine whether the user is qualified for posting in the illustrated example. When a user is qualified for posting, the posting reception unit 478 transmits an input screen for posting to the client 400 via a communication unit 168. The posting reception unit 478 is implemented, for example, by a CPU operating in accordance with a program stored in a memory.

Figure 20:
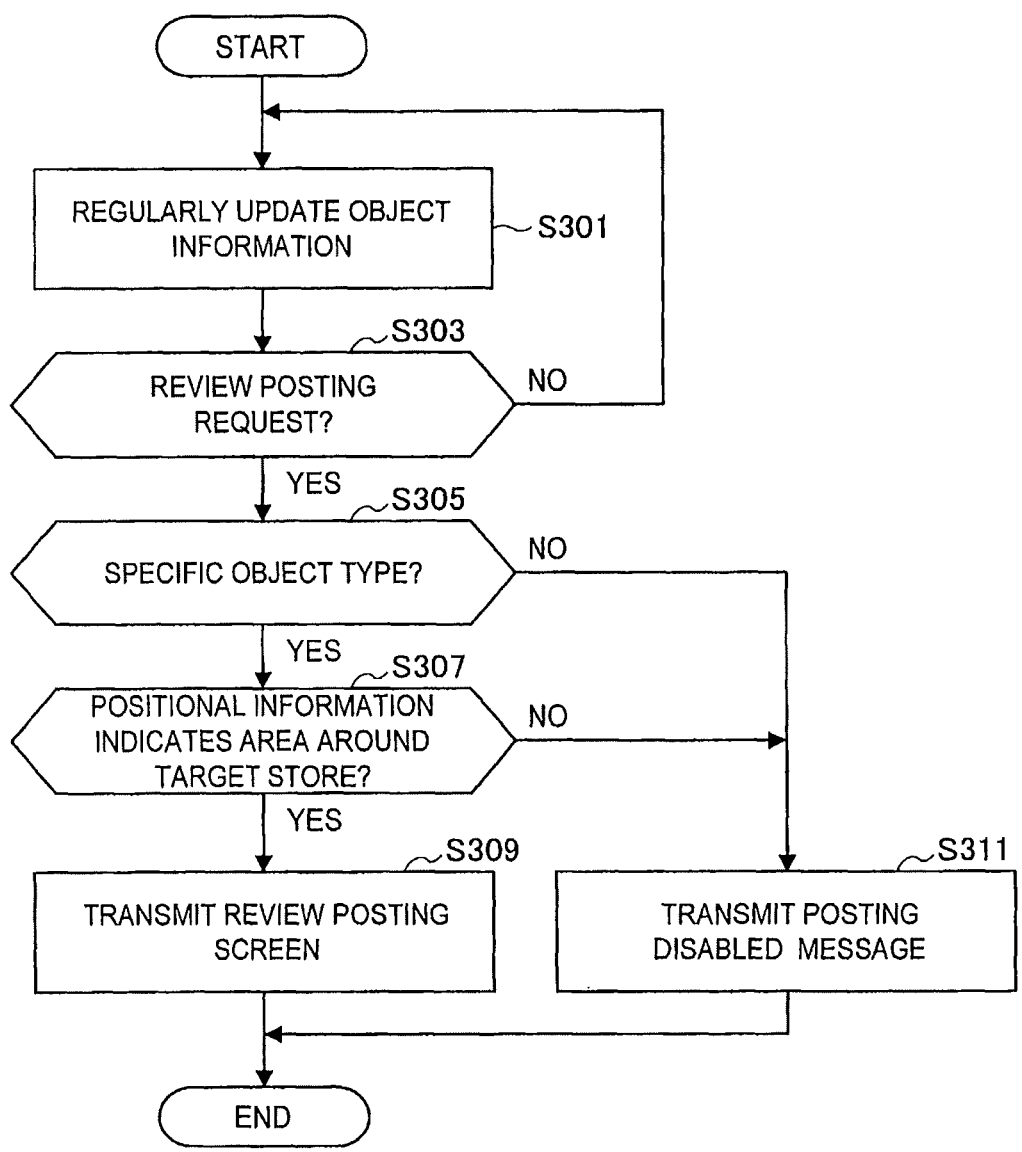
FIG. 20 is a flowchart illustrating the modified example of the third embodiment of the present disclosure.

FIG. 20 is a flowchart illustrating a modified example of the third embodiment of the present disclosure. First of all, an object generating unit 162 regularly updates object information stored in the user DB 166 on the basis of an attribute score calculated by an attribute score calculating unit 158 in the server 450 (step S301). This also updates, for example, the items in "object type" illustrated in FIG. 15. Here, when the client 400 makes a review posting request (step S303), a process for making a determination on the basis of an object type is executed in the server 450. Additionally, the review means here information such as an evaluation of a restaurant or the like provided from a user who has used the restaurant.

Here, the posting reception unit 478 determines whether a user who has transmitted a review posting request is associated with a predetermined object type (step S305). This determination may be made, for example, on the basis of object information stored in the user DB 166 for an object generated by the object generating unit 162 in advance. Alternatively, when a determination is made, the object generating unit 162 may generate an object on the basis of an attribute score and a determination may be made on the basis of the type of that object. Additionally, the predetermined object type is, for example, set in advance for each review posting target store or each community for which a review is displayed.

In step S305, when a user is associated with a predetermined object attribute, the posting reception unit 478 further references the user DB 166 to determine whether positional information on the user indicates an area around a review posting target store (step S307). Here, when it is determined that the positional information on the user indicates an area around the store, the posting reception unit 478 transmits a review posting screen to the client 400 via the communication unit 168 (step S309). To the contrary, when a negative determination is made in step S305 or step S307, the posting reception unit 478 transmits a message indicating that it is not possible to receive a review posting (posting disabled message) to the client 400 via the communication unit 168 (step S311).

These processes allow, for example, users who post reviews about a store to be limited to users having a specific attribute (such as ladies only and adults only). For example, when a store sets a target group of the store, or when reviews are shown in a community that targets users having a specific attribute, such limitation may be effective. In addition, if the positions of users are limited to an area around a store, only reviews made by actual users of the store immediately after using the store can be received. For example, when it is desired to exclude shills or to make much of the freshness of reviews, such limitation may be effective.

4. Fourth Embodiment

Next, a fourth embodiment of the present disclosure will be described with reference to FIGS. 21 to 24. This fourth embodiment is different from the second embodiment in terms of display and sharing of a generated object. Additionally, others such as the functional configuration are the same as those of the second embodiment, so that the repeated detailed description will be omitted.

Figure 21:
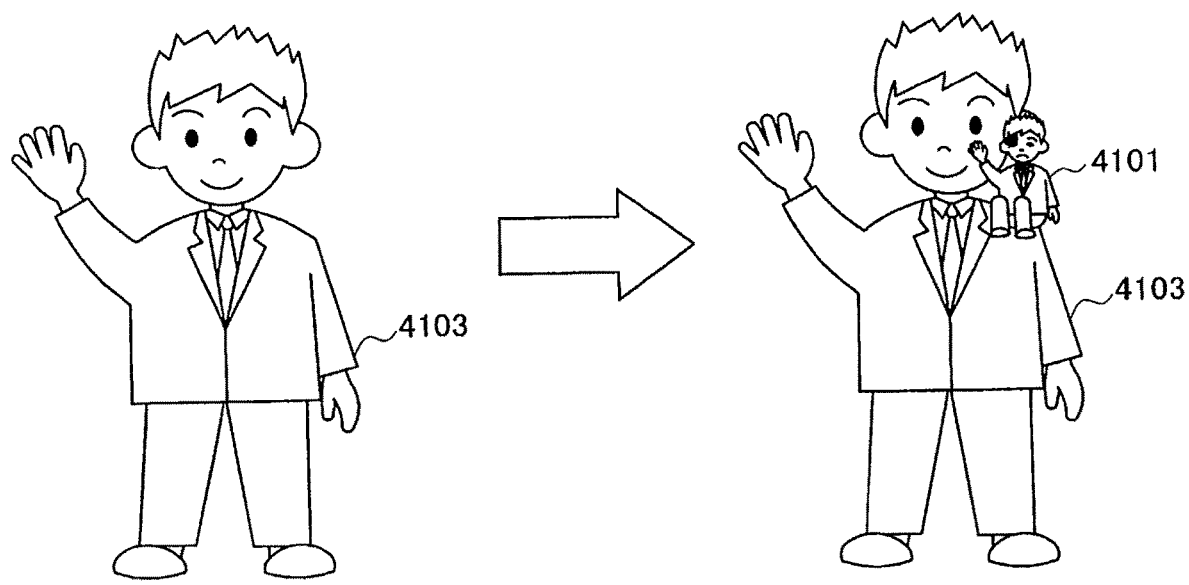
FIG. 21 is a diagram illustrating a first display example in a fourth embodiment of the present disclosure.

FIG. 21 is a diagram illustrating a first display example in the fourth embodiment of the present disclosure. An object superimposed on an actual image of a user is shared among a plurality of users in the present embodiment. That is to say, the history acquiring unit 156 of the server 150 acquires action history information for a plurality of users, the attribute score calculating unit 158 calculates attribute scores for a plurality of users, and the object generating unit 162 generates an object that is visually recognizable to each of users.

As an example, it is conceivable that each user acts with a head mounted display that is, for example, disclosed in JP 2008-83290A and can visually recognize the outside, and when the user sees another user, an object is superimposed on the user. A male user looking healthy is displayed as an actual image 4103, and an object 4101 of a man looking unhealthy is superimposed thereon in the illustrated example. The object 4101 may indicate, for example, that the user actually leads an unhealthy life. The display of the object 4101 reveals to other users that the user leads an unhealthy life.

In this way, an object may function as an avatar (copy) indicating a state of a user that is not visually apparent. In this case, for example, a user can be motivated to improve an actual action of the user such as leading a healthier life in order to make an avatar viewed by other users look better. Communication among users may be made more active by allowing avatars to be displayed to limited users and allowing evaluations such as comments on avatars to be transmitted. If users themselves can visually recognize avatars, the users can feel as if the users were virtually accompanied by the avatars. Accordingly, the users do not necessary have to share the display of an avatar with other users to enjoy themselves in some cases.

Additionally, a displayed avatar may be a literal "copy" that is the same sex and age as a user, may also be the different sex from a user, and may be not a human but an animal. For example, a male user may be accompanied by an avatar of a woman as a virtual girlfriend, or may also be accompanied by an avatar of an animal like a pet. However, even in this case, an action of a user himself or herself is reflected on an appearance of an avatar. For example, when a male user is accompanied by a girlfriend as an avatar, an unhealthy life of the user makes the girlfriend look unhealthy. In addition, when a user is accompanied by a pet as an avatar, an unhealthy life of the user makes the pet look dirty. In this way, even when an avatar is not necessarily displayed as a literal "copy" of a user, the avatar reflects the personality of the user and may, for example, advantageously motivate the user to improve his or her action or look friendly.

Figure 22:
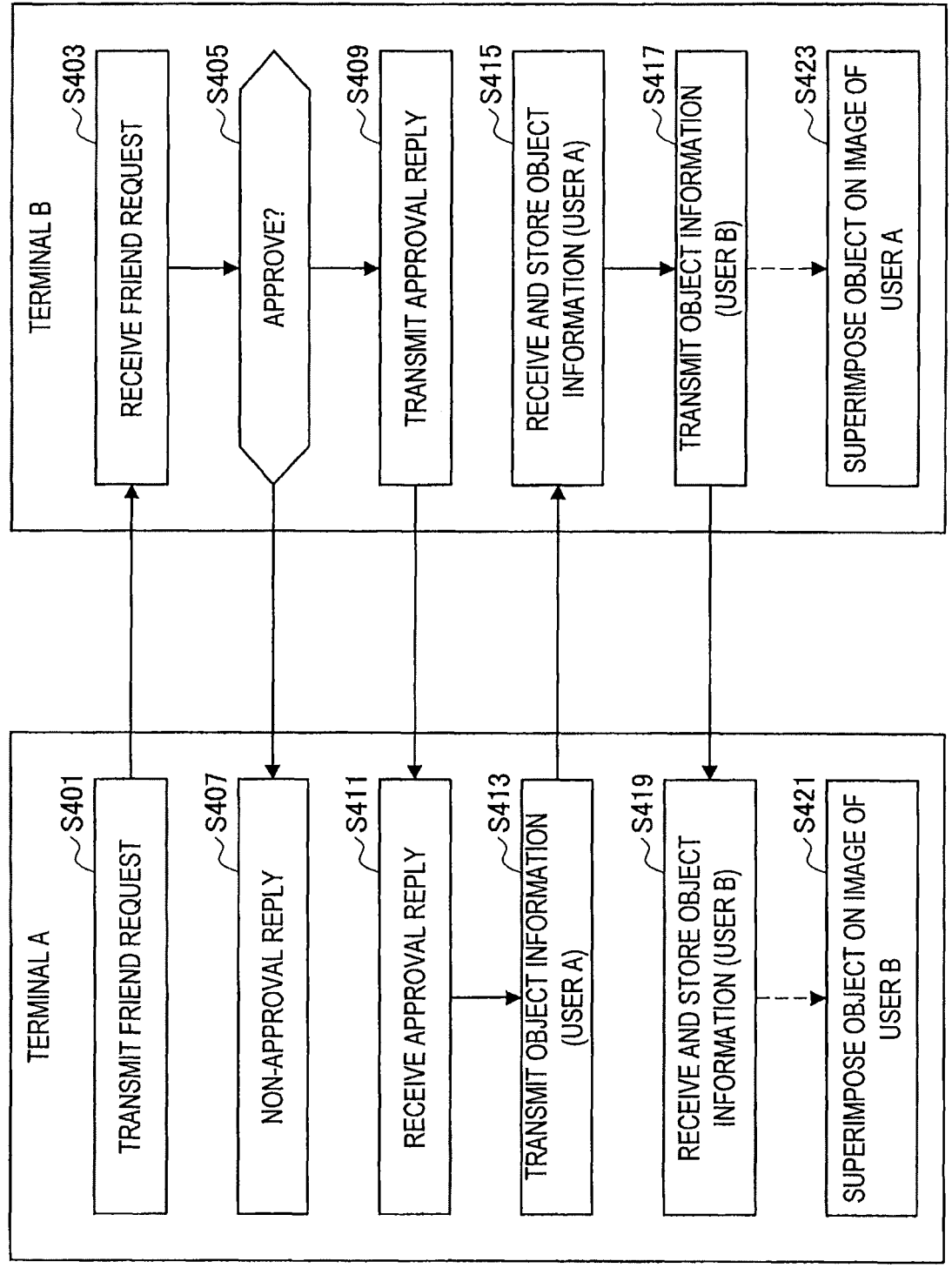
FIG. 22 is a diagram illustrating an example of a process of sharing display of an object in friend registration between users in the fourth embodiment of the present disclosure.

FIG. 22 is a diagram illustrating an example of a process of sharing the display of an object in friend registration between users in the fourth embodiment of the present disclosure. First of all, a terminal A used by a user A transmits a friend request (step S401). A terminal B used by a user B receives this friend request (step S403), and determines whether to approve the friend request, for example, on the basis of an operation of the user B (step S405). Here, if the friend request is not approved, a non-approval reply is returned to the terminal A (step S407), and then the processes terminate.

To the contrary, if the friend request is approved in step S405, the terminal B transmits an approval reply (step S409). After receiving the approval reply (step S411), the terminal A transmits object information on the user A to the terminal B (step S413). The object information transmitted here has been generated, for example, by the object generating unit 162 of the server 150 as in the second embodiment, and transmitted to the terminal A. The object information received from the server 150 is stored in the terminal A, and the stored object information is transmitted in step S413.

Here, the terminal B receives and stores the object information on the user A (step S415). Next, the terminal B transmits object information on the user B to the terminal A (step S417). The terminal A receives and stores the object information on the user B (step S419). This allows the terminal A and the terminal B to share the object information on both of the terminals A and B. The terminal A will be able to superimpose an object of the user B on an actual image of the user B below (step S421), while the terminal B will be able to superimpose an object of the user A on an actual image of the user A (step S423). Additionally, let us assume that it is possible for both of the terminal A and the terminal B to recognize the faces of the user A and the user B on the basis of information exchanged in advance. When a change in an action history of each user updates the object after these processes, the object may be transmitted again (step S413 or step S417).

Additionally, FIG. 22 has described an example of a peer to peer (P2P) system in which terminals communicate with each other via no server, but the display of an object may be shared between users through communication via a server. In this case, each terminal device does not have to store an object, and all the terminal has to do is to add each other to each object display target stored in the server (e.g. when the user B is a first friend to the user A, the user B is set to the object display target of the user A in addition to the user A (himself or herself) and both of the terminal A and the terminal B can display the object).

FIG. 23 is a diagram illustrating a second display example in the fourth embodiment of the present disclosure. An objects corresponding to each user fights for the user in the illustrated example. An object 5101*a* is an avatar of a user A, while an object 5101*b* is an avatar of a user B. A screen 5100*a* of the user A displays an image showing these objects 5101 standing on a notebook PC used as a prize ring from the perspective of the object 5101*a*, while a screen 5100*b* of the user B displays an image showing the same situation from the perspective of the object 5101*b*. Different from the example of FIG. 21, the objects 5101 are not superimposed on the images of the users. For example, such a performance may be conducted that an avatar which usually sits on a shoulder of a user as in the example of FIG. 21 gets off the shoulder to fight against an opponent once a fight begins.

In that example, a parameter (fighting parameter) for a function for such a fight may be set for an object (avatar) generated by the object generating unit 162 of the server 150. A fighting parameter may be set on the basis of an attribute score common to both of the users. For example, a fighting parameter may be set in accordance with the "exercise filter" in the example of FIG. 5. In this case, for example, users who more frequently act with high calorie consumption have higher fighting parameters such as intelligence, stamina, discernment, concentration, and luck. Thus, users who train themselves on a daily basis may have advantage in fights using avatars.

Alternatively, a fighting parameter may be set on the basis of an attribute score set by each user with a filter and the like. In this case, for example, each user can specify a filter for an attribute at which the user is good, generate an avatar, and then begin a fight. For example, the user A sets a fighting parameter in accordance with the "exercise filter", while the user B may set a fighting parameter in accordance with the "shopping filter." in this case, it is not true that an avatar of a user who has physical strength constantly wins a fight, but a user having a remarkable attribute score for some attribute wins in some cases.

In addition, a fighting parameter may be reflected on an appearance of an avatar or not. For example, a generating condition used for generating an appearance of an avatar may be different from a generating condition used for generating a fighting parameter set for the avatar. In this case, a fight having game elements increased by such a gap between appearance and strength is conducted that an avatar of a professional baseball player whose hobby is, for example, fishing does not look very strong because a filter "way to spend a leisure time" is set for an appearance of the avatar, but the avatar is excessively strong because the "exercise filter" is set for a fighting parameter.

Figure 24:
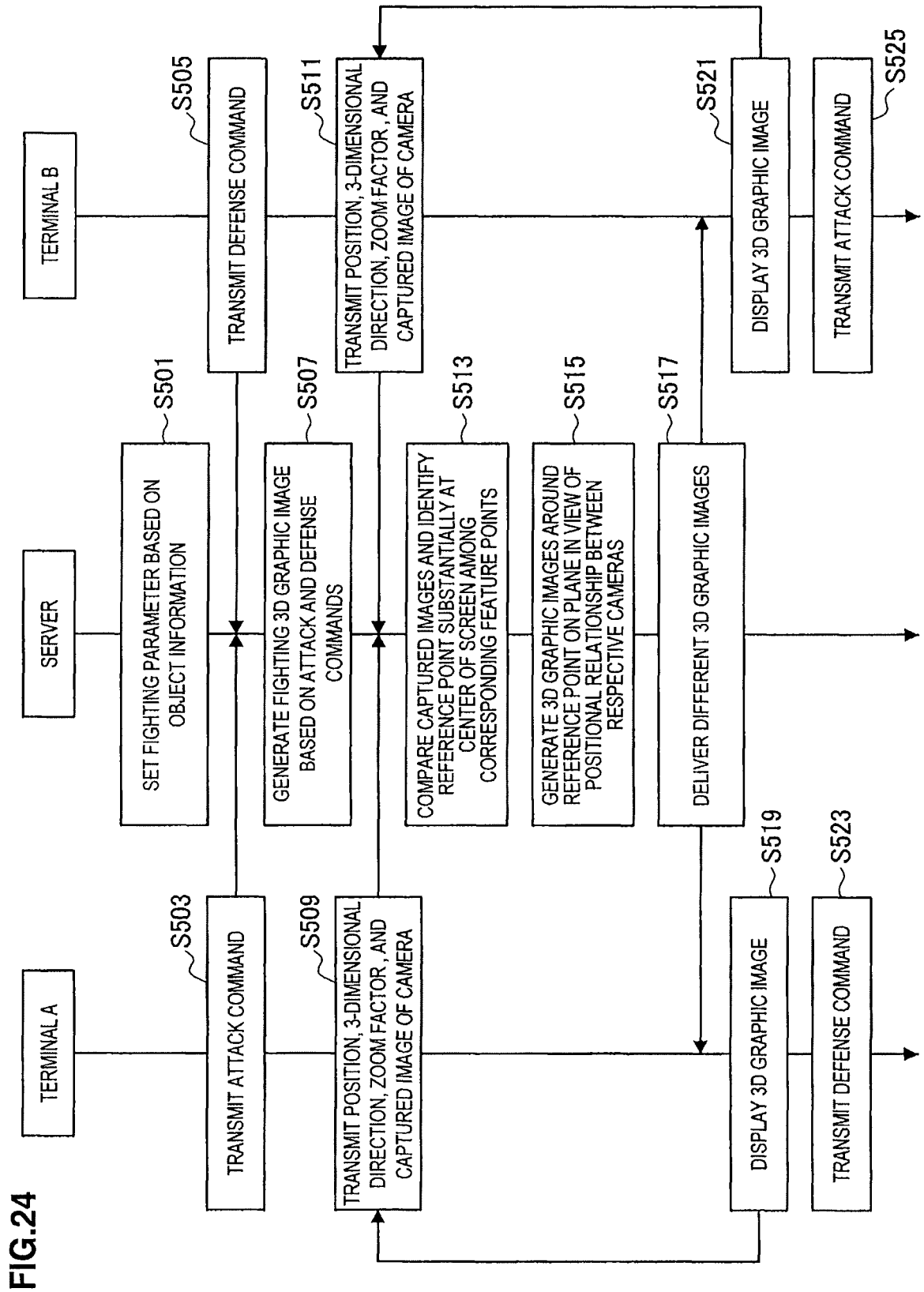
FIG. 24 is a flowchart illustrating an example of a process for implementing display as illustrated in FIG. 23.

FIG. 24 is a flowchart illustrating an example of a process for implementing display as illustrated in FIG. 23. A terminal A and a terminal B are used by a user A and a user B, respectively, in the illustrated example. A server may have a function of generating an object like the server 150 in the above-described examples, or may also be a different server prepared for a fighting game. In the former case, the server includes a structural element that controls a fighting game as a functional unit to execute a predetermined function in the same way as the message transmitting unit 476, for example, in the third embodiment. In the latter case, the server acquires object information generated by the object generating unit 162 from the server 150 in advance.

First of all, as a step of preparing for a fight, a fighting parameter is set in the server on the basis of object information on each user (step S501). The terminal A and the terminal B then transmit an attack command (step S503) and a defense command (step S505), respectively. A fighting 3D graphic image is generated in the server on the basis of the transmitted attack and defense commands (step S507).

Next, each of the terminal A and the terminal B transmits a captured image indicating the position, a three-dimensional direction, a zoom factor, and the like of a terminal camera (steps S509 and S511). The server, which receives these captured images, compares the captured images to identify a reference point substantially at the center of the screen among the corresponding feature points (step S513). Next, the server generates 3D graphic images around the reference point on a plane in view of a positional relationship between the respective cameras (step S515), and delivers the different 3D graphic images to the terminal A and the terminal B (step S517).

Next, each of the terminal A and the terminal B displays the 3D graphic image delivered to the terminal (steps S519 and S521). When the viewpoint of each terminal changes, the processes in steps S509 to S521 are repeated. Thereafter, an attack side is exchanged with a defense side as a next turn operation, the terminal A transmits a defense command (step S523), and the terminal B transmits an attack command (step S525). The same processes will be repeated thereafter.

Additionally, the processes are examples, and other various fighting games are possible in an embodiment of the present disclosure. For example, an image for a fighting game does not necessarily have to be a 3D image, or a game may proceed without an attack command or a defense command. In addition, any game other than a fighting game is also possible, and a game may be played by a single user. Even in this case, a user can enjoy himself or herself in the same way as the fighting game by operating a player character generated on the basis of an attribute score of him or her.

In addition, an example in which objects such as avatars are superimposed on actual images of users has been described in the present embodiment, but avatars may be displayed on a screen for an application in another embodiment. Thus, an avatar does not necessarily have to be superimposed on actual space in a fighting game (or other games), and an avatar of a user may function as a player character on the same screen as a common 2D or 3D game screen.

5. Hardware Configuration

Next, a hardware configuration of an information processing device according to an embodiment of the present disclosure will be described with reference to FIG. 25. FIG. 25 is a block diagram for describing a hardware configuration of an information processing device. An illustrated information processing device 900 may implement, for example, the various servers and clients in the above-described embodiments.

The information processing device 900 includes a central processing unit (CPU) 901, read only memory (ROM) 903, and random access memory (RAM) 905. In addition, the information processing device 900 may include a host bus 907, a bridge 909, an external bus 911, an interface 913, an input device 915, an output device 917, a storage device 919, a drive 921, a connection port 923, and a communication device 925. Further, the information processing device 900 may include an imaging device 933 and a sensor 935 as necessary. The information processing device 900 may include a processing circuit such as a digital signal processor (DSP) instead of or in addition to the CPU 901.

The CPU 901 functions as an operation processor and a controller, and controls all or some operations in the information processing device 900 in accordance with a variety of programs recorded on the ROM 903, the RAM 905, the storage device 919, or a removable recording medium 927. The ROM 903 stores a program, an operation parameter, and the like which are used by the CPU 901. The RAM 905 primarily stores a program which is used in the execution of the CPU 901 and a parameter which is appropriately modified in the execution. The CPU 901, the ROM 903, and the RAM 905 are connected to each other by the host bus 907 including an internal bus such as a CPU bus. In addition, the host bus 907 is connected to the external bus 911, such as a peripheral component interconnect/interface (PCI) bus via the bridge 909.

The input device 915 is a device which is operated by a user, such as a mouse, a keyboard, a touch panel, a button, a switch, and a lever. The input device 915 may be, for example, a remote control device using infrared light or other radio waves, or may be an external connection device 929 such as a mobile phone operable in response to the operation of the information processing device 900. The input device 915 includes an input control circuit which generates an input signal on the basis of information input by a user and outputs the input signal to the CPU 901. By operating the input device 915, a user inputs various types of data to the information processing device 900 or requires a processing operation.

The output device 917 includes a device capable of visually or audibly notifying the user of acquired information. The output device 917 may be a display device (or may be a see-through display device or a head mounted display) such as a liquid crystal display (LCD), a plasma display panel (PDP), and an organic electro-luminescence (EL) display, an audio output device such as a speaker and a headphone, a printer device, or the like. The output device 917 may output a result obtained from the processing of the information processing device 900 in a form of a video such as text and an image, and an audio such as voice and sound.

The storage device 919 is a device for data storage which is configured as an example of a storage unit of the information processing device 900. The storage device 919 includes, for example, a magnetic storage device such as a hard disk drive (HDD), a semiconductor storage device, an optical storage device, or a magneto-optical storage device. The storage device 919 stores a program to be executed by the CPU 901, various types of data, various types of data acquired from the outside, and the like.

The drive 921 is a reader/writer for the removable recording medium 927 such as a magnetic disk, an optical disc, a magneto-optical disk, and a semiconductor memory, and is built in the information processing device 900 or externally attached thereto. The drive 921 reads out information recorded in the removable recording medium 927 attached thereto, and outputs the read-out information to the RAM 905. Further, the drive 921 writes record in the removable recording medium 927 attached thereto.

The connection port 923 is a port used to directly connect a device to the information processing device 900. The connection port 923 may include, for example, a universal serial bus (USB) port, an IEEE1394 port, and a small computer system interface (SCSI) port. The connection port 923 may further include an RS-232C port, an optical audio terminal, a high-definition multimedia interface (HDMI) port, and so on. The connection of the external connection device 929 to the connection port 923 makes it possible to exchange various types of data between the information processing device 900 and the external connection device 929.

The communication device 925 is, for example, a communication interface including a communication device or the like for a connection to a communication network 931. The communication device 925 may be, for example, a communication card for a wired or wireless local area network (LAN), Bluetooth (registered trademark), a wireless USB (WUSB) or the like. In addition, the communication device 925 may be a router for optical communication, a router for an asymmetric digital subscriber line (ADSL), a modem for various kinds of communication, or the like. The communication device 925 transmits a signal to and receives a signal from, for example, the Internet or other communication devices on the basis of a predetermined protocol such as TCP/IP. In addition, the communication network 931 connected to the communication device 925 may be a network connected in a wired or wireless manner, and is, for example, the Internet, a home LAN, infrared communication, radio wave communication, satellite communication, or the like.

The imaging device 933 is a device that generates a captured image by shooting an image of real space using an image sensor such as a charge coupled device (CCD) or complementary metal oxide semiconductor (CMOS), as well as various members such as a lens for controlling the formation of a subject image on the image sensor, for example. The imaging device 933 may be a device that shoots a still image, and may also be a device that shoots a moving image.

The sensor 935 includes various sensors such as an acceleration sensor, a gyro sensor, a geomagnetic sensor, an optical sensor, and an audio sensor. The sensor 935 acquires information on a state of the information processing device 900, such as the posture of the case of the information processing device 900, and information on an environment around the information processing device 900, such as the brightness and noise around the information processing device 900. The sensor 935 may also include a global positioning system (GPS) sensor that receives GPS signals and measures the latitude, longitude, and altitude of the device.

The example of the hardware configuration of the information processing device 900 has been described so far. Each of the above-described structural elements may be configured using a general-purpose member, and may also be configured using hardware specialized in the function of each structural element. Such a configuration may also be modified as appropriate in accordance with the technological level at the time of the implementation.

6. Supplement

The embodiments of the present disclosure may include, for example, an information processing device (client and various servers) and a system as described above, an information processing method executed by the information processing device or the system, a program for causing the information processing device to function, and a recording medium having the program recorded thereon.

Additionally, the various servers and clients in the above-described embodiments do not necessarily have to be implemented as devices that serve as servers or clients on a network. An embodiment of the present disclosure can be implemented, for example, by each terminal (information processing device) operating as a variety of servers or clients on a so-called mesh network.

The preferred embodiments of the present invention have been described above with reference to the accompanying drawings, whilst the present invention is not limited to the above examples, of course. A person skilled in the art may find various alterations and modifications within the scope of the appended claims, and it should be understood that they will naturally come under the technical scope of the present invention.

Additionally, the present technology may also be configured as below.

(1)
An information processing device including:
an action history acquiring unit configured to acquire action history information on a user, the action history information being accumulated in a predetermined time frame;
an attribute score calculating unit configured to calculate an attribute score of the user for one or more attributes in an attribute group, the attribute score being based on the action history information; and
an object generating unit configured to generate an object on the basis of the attribute score, the object representing the user.

(2)
The information processing device according to (1), further including:
a condition setting unit configured to set a generating condition of the object.

(3)
The information processing device according to (2),
wherein the condition setting unit includes an attribute selecting unit configured to select the attribute score to be emphasized for generating the object.

(4)
The information processing device according to (2) or (3),
wherein the condition setting unit includes a time frame selecting unit configured to select a time frame of the predetermined time frame to be emphasized for generating the object.

(5)
The information processing device according to any one of (2) to (4),
wherein the condition setting unit sets the generating condition in accordance with an operation of the user.

(6)
The information processing device according to any one of (2) to (5),
wherein the condition setting unit sets the generating condition in accordance with a situation in which the object is displayed.

(7)
The information processing device according to any one of (1) to (6),
wherein the attribute score calculating unit calculates the attribute scores for a plurality of attributes in the attribute group, and
wherein the object generating unit selects a type of the object on the basis of comparison among the attribute scores for the respective attributes.

(8)
The information processing device according to any one of (1) to (7),
wherein the attribute group includes an attribute indicating whether a predetermined event has been achieved.

(9)
The information processing device according to any one of (1) to (8),
wherein the object generating unit generates the object to be superimposed on an actual image of the user.

(10)
The information processing device according to (9),
wherein the object generating unit generates the object for hiding the user by displaying a background of the actual image of the user.

(11)
The information processing device according to any one of (1) to (10),
wherein the object generating unit generates the object that changes step by step in accordance with the attribute scores.

(12)
The information processing device according to any one of (1) to (11),
wherein the object generating unit generates the object that changes a color in accordance with the attribute scores.

(13)
The information processing device according to any one of (1) to (12),
wherein the object generating unit generates the object to be displayed on a map.

(14)
The information processing device according to (13), further including:
an operation acquiring unit configured to acquire information on an operation for an observer of the objects displayed on the map to specify at least a part of the objects; and
a functional unit configured to execute a predetermined function on the user corresponding to the specified object.

(15)
The information processing device according to (14),
wherein the operation includes an operation of specifying an area on the map.

(16)
The information processing device according to any one of (1) to (15),
wherein the action history acquiring unit acquires the action history information on a plurality of users,
wherein the attribute score calculating unit calculates the attribute scores for the plurality of users, and
wherein the object generating unit generates the object that is visually recognizable to each of the plurality of users.

(17)
An information processing device including:
a sensing unit configured to sense an action of a user;
a communication unit configured to transmit a result of the sensing to a server, and to receive information on an object from the server, the object being generated on the basis of an attribute score calculated for one or more attributes in an attribute group on the basis of action history information on the user accumulated in a predetermined time frame and representing the user, the action history information being generated on the basis of information including the result of the sensing; and
a display control unit configured to cause a display unit to display the object.

(18)
A system including:
a client; and
a server,
wherein the client includes
a sensing unit configured to sense an action of a user,
a communication unit configured to transmit a result of the sensing to the server, and to receive information on an object from the server, the object representing the user, and
a display control unit configured to cause a display unit to display the object, and
wherein the server includes
an action history acquiring unit configured to acquire action history information on the user, the action history information being accumulated in a predetermined time frame and being generated on the basis of information including the result of the sensing, an attribute score calculating unit configured to calculate an attribute score of the user for one or more attributes in an attribute group, the attribute score being based on the action history information, and an object generating unit configured to generate the object on the basis of the attribute score.

(19)

An information processing method including:

acquiring action history information on a user, the action history information being accumulated in a predetermined time frame;

calculating an attribute score of the user for one or more attributes in an attribute group, the attribute score being based on the action history information; and generating an object on the basis of the attribute score, the object representing the user.

(20)

A program for causing a computer to execute:

a function of acquiring action history information on a user, the action history information being accumulated in a predetermined time frame;

a function of calculating an attribute score of the user for one or more attributes in an attribute group, the attribute score being based on the action history information; and a function of generating an object on the basis of the attribute score, the object representing the user.

REFERENCE SIGNS LIST 10, 20, 30, 40, 42 system
100, 300, 400 device
102 sensing unit
104 input unit
106 display control unit
108 display unit
110 communication unit
240 action recognizing server
150, 250 server (object server)
152 action recognizing unit
156 action history acquiring unit
158 attribute score calculating unit
162 object generating unit
168, 268 communication unit
170 time frame selecting unit
172 attribute selecting unit
474 operation acquiring unit
476 message transmitting unit
478 posting reception unit

The invention claimed is:

1. An information processing device comprising:
circuitry configured to
acquire action history information from a plurality of users, the action history information including a geographical location of each user of the plurality of users and an activity type of each user of the plurality of users in a predetermined time slot which is a series of a plurality of time frames, respectively;
calculate one or more attribute scores of each user of the plurality of users, in accordance with the action history information;
select a target object type among one or more object types for each user, the target object type being determined by comparing the one or more attribute scores of the user calculated in different time frames in the series of the plurality of time frames, each of the one or more object types indicating a respective feature of a current action of the user;
extract a plurality of virtual objects each representing each user of the plurality of users, based on the target object type and the geographical location of the action history information for the respective user;
map the plurality of virtual objects on a geographical map, based on the geographical location of the action history information for the respective user;
specify at least one user from the plurality of users represented by one of the virtual objects on the geographical map, by selecting respective virtual object of the at least one user based on the current action and the geographical location on the geographical map; and
transmit a message to the specified user.

2. The information processing device according to claim 1, wherein the circuitry is configured to set a generating condition of each virtual object of the plurality of virtual objects.

3. The information processing device according to claim 2, wherein the circuitry is configured to select a certain time frame of the predetermined time slot to be emphasized for selecting the object type generating each virtual object of the virtual objects.

4. The information processing device according to claim 2, wherein the circuitry sets the generating condition in accordance with an operation by at least one of the plurality of users.

5. The information processing device according to claim 1, wherein at least one attribute score of the one or more attribute scores includes an attribute indicating whether a predetermined event has been achieved.

6. The information processing device according to claim 1, wherein the circuitry generates the virtual objects that are visually recognizable to each of the plurality of users.

7. The information processing device according to claim 1, wherein at least one of the attribute score of the one or more attribute scores indicates at least one of walking, moving in a car and moving in a train.

8. An information processing method comprising:
acquiring action history information from a plurality of users, the action history information including a geographical location of each user of the plurality of users and an activity type of each user of the plurality of users in a predetermined time slot which is a series of a plurality of time frames, respectively;
calculating one or more attribute scores of each user of the plurality of users, in accordance with the action history information;
selecting a target object type among one or more object types for each user, the target object type being determined by comparing the one or more attribute scores of the user calculated in different time frames in the series of the plurality of time frames, each of the one or more object types indicating a respective feature of a current action of the user;
extracting a plurality of virtual objects each representing each user of the plurality of users, based on the target object type and the geographical location of the action history information for the respective user;
mapping the plurality of virtual objects on a geographical map, based on the geographical location of the action history information for the respective user,
specifying at least one user from the plurality of users represented by one of the virtual objects on the geographical map, by selecting respective virtual object of the at least one user based on the current action and the geographical location on the geographical map; and
transmitting a message to the specified user.

9. The information processing method according to claim 8, further comprising: setting a generating condition of each virtual object of the plurality of virtual objects.

10. The information processing method according to claim 9, further comprising: selecting a certain time frame of the predetermined time slot to be emphasized for generating each virtual object of the virtual objects.

11. The information processing method according to claim 9, further comprising: setting the generating condition in accordance with an operation by at least one of the plurality of users.

12. The information processing device according to claim 8, wherein at least one attribute score of the one or more attribute scores includes an attribute indicating whether a predetermined event has been achieved.

13. The information processing device according to claim 8, further comprising: generating the virtual objects that are visually recognizable to each of the plurality of users.

14. The information processing device according to claim 8, wherein at least one of the attribute score of the one or more attribute scores indicates at least one of walking, moving in a car and moving in a train.

15. A non-transitory computer readable medium having stored thereon a program that when executed by processing circuitry of a computer causes the computer to implement an information processing method comprising:
   acquiring action history information from a plurality of users, the action history information including a geographical location of each user of the plurality of users and an activity type of each user of the plurality of users in a predetermined time slot which is a series of a plurality of time frames, respectively;
   calculating one or more attribute scores of each user of the plurality of users, in accordance with the action history information;
   selecting a target object type among one or more object types for each user, the target object type being determined by comparing the one or more attribute scores of the user calculated in different time frames in the series of the plurality of time frames, each of the one or more object types indicating a respective feature of a current action of the user;
   extracting a plurality of virtual objects each representing each user of the plurality of users, based on the target object type and the geographical location of the action history information for the respective user;
   mapping the plurality of virtual objects on a geographical map, based on the geographical location of the action history information for the respective user,
   specifying at least one user from the plurality of users represented by one of the virtual objects on the geographical map, by selecting respective virtual object of the at least one user based on the current action and the geographical location on the geographical map; and
   transmitting a message to the specified user.

16. The non-transitory computer readable medium according to claim 15, wherein the method further comprises setting a generating condition of each virtual object of the plurality of virtual objects.

17. The non-transitory computer readable medium according to claim 16, wherein the method further comprises selecting a certain time frame of the predetermined time slot to be emphasized for generating each virtual object of the virtual objects.

18. The non-transitory computer readable medium according to claim 16, wherein the method further comprises setting the generating condition in accordance with an operation by at least one of the plurality of users.

19. The non-transitory computer readable medium according to claim 15, wherein at least one attribute score of the one or more attribute scores includes an attribute indicating whether a predetermined event has been achieved.

20. The non-transitory computer readable medium according to claim 15, wherein the method further comprises generating the virtual objects that are visually recognizable to each of the plurality of users.

21. The non-transitory computer readable medium according to claim 15, wherein at least one of the attribute score of the one or more attribute scores indicates at least one of walking, moving in a car and moving in a train.

* * * * *